US012801771B2

(12) United States Patent
Passoja

(10) Patent No.: US 12,801,771 B2
(45) Date of Patent: Nov. 17, 2026

(54) SECURE DIGITAL IDENTITY AUTHENTICATION AND RIGHTS MANAGEMENT

(71) Applicant: Seventh Planet, Inc., Los Angeles, CA (US)

(72) Inventor: Erik Passoja, Los Angeles, CA (US)

(73) Assignee: SEVENTH PLANET, INC., Los Angeles, CA (US)

( * ) Notice: Subject to any disclaimer, the term of this patent is extended or adjusted under 35 U.S.C. 154(b) by 138 days.

(21) Appl. No.: 18/898,357

(22) Filed: Sep. 26, 2024

(65) Prior Publication Data

US 2025/0103743 A1 Mar. 27, 2025

Related U.S. Application Data

(60) Provisional application No. 63/571,793, filed on Mar. 29, 2024, provisional application No. 63/603,610, filed on Nov. 28, 2023, provisional application No. 63/540,385, filed on Sep. 26, 2023.

(51) Int. Cl.
*H04L 29/06* (2006.01)
*G06F 21/62* (2013.01)

(52) U.S. Cl.
CPC ................................ *G06F 21/6218* (2013.01)

(58) Field of Classification Search
CPC .......... H04W 12/50; H04W 76/14; G06F 8/65
See application file for complete search history.

(56) References Cited

U.S. PATENT DOCUMENTS

2009/0287837 A1* 11/2009 Felsher ............... G06F 21/6245 709/229
2021/0233204 A1* 7/2021 Alattar .................... G06F 18/22
2022/0130008 A1* 4/2022 Jalali ........................ G06F 21/16
2023/0022018 A1* 1/2023 Spaulding .............. G06F 21/16
2026/0044581 A1 2/2026 Drolet, Sr.
2026/0044583 A1 2/2026 Drolet, Sr.

OTHER PUBLICATIONS

Coalition for Content Provenance and Authenticity. (Dec. 21, 2021). C2PA technical specification (Version 1.0). https://spec.c2pa.org/specifications/specifications/1.0/specs/C2PA_Specification.html.

* cited by examiner

*Primary Examiner* — Wasika Nipa

(57) ABSTRACT

An integrated system and method for protecting, managing, and monetizing performers' digital identities using digital watermarks, consent matrices, and distributed ledger technology. The system captures biometric data, encodes it with digital watermarking, and utilizes a record system to ensure secure and verifiable consent management. Smart contracts automate usage after permissions are verified, enabling ethical use and fair compensation of digital identities across various media platforms. This system provides a comprehensive solution for the challenges posed by the digital era, such as deepfakes and unauthorized use of digital likenesses, by offering transparency, security, and respect for individual rights.

19 Claims, 8 Drawing Sheets

SECURE DIGITAL IDENTITY AUTHENTICATION AND RIGHTS MANAGEMENT

CROSS-REFERENCE TO THE RELATED APPLICATION

This U.S. nonprovisional patent application claims the benefit of priority to U.S. provisional patent application No. 63/540,385, filed on Sep. 26, 2023, to U.S. provisional patent application No. 63/603,610, filed on Nov. 28, 2023. and to U.S. provisional patent application No. 63/571,793, filed on Mar. 29, 2024. The contents of U.S. provisional patent application No. 63/540,385, U.S. provisional patent application No. 63/603,610, and U.S. provisional patent application No. 63/571,793 are herein incorporated by reference herein in their entireties.

BACKGROUND

Development of robust systems for digital identity protection has never been more urgent than at the dawn of widespread use of Artificial Intelligence (AI). Recent events have starkly highlighted the potential for misuse and the profound consequences of unauthorized digital identity manipulation. As an example, a deepfake of President Biden's voice in a New Hampshire robocall and a deepfake of Taylor Swift's likeness in a pornographic video represent just the tip of the iceberg in potential abuses. An example of the kinds of threats societies face include impersonation in critical communications, such as if a deepfake of a doctor advises a patient to dangerously alter their medication dosage. As another example, a deepfake voice could trick a school into releasing a child to an unauthorized individual. As yet another example, a fabricated announcement from a national leader about an impending missile attack could create widespread panic and chaos.

Recent legislative efforts and societal concerns underscore the urgent need for enhanced protection and management of digital identities. A recent Memorandum of Agreement on AI from SAG-AFTRA (the Screen Actors Guild-American Federation of Television and Radio Artists) outlines commitments to ethical AI use, reflecting global consensus on the importance of responsible innovation. Similar recent initiatives in the United States include Senator Warren's Anti-Money Laundering Act S. 2669 and Tennessee's "ELVIS Act" HB. 2091. These initiatives highlight legislative responses to the misuse of technology, including AI, in financial crimes and unauthorized digital reproductions, respectively.

These developments illustrate a critical and growing demand for systems that not only counteract identity misuse, as with deepfakes, but also address the comprehensive spectrum of digital identity management. This includes ensuring financial transparency, protecting against unauthorized use of likeness, and upholding ethical standards in AI development and deployment.

SUMMARY

The teachings herein offer a robust framework for digital identity protection that allows for integration of advanced digital watermarking with secure memory verification such as blockchain verification. The comprehensive teachings are designed to secure and manage digital replicas across various contexts, providing a versatile tool for upholding the principles outlined in recent legislative and policy frameworks. By safeguarding digital identities, we aim to foster a digital environment where innovation flourishes within the bounds of ethical use, financial integrity, and respect for individual rights.

A digital replica as described herein comprises or is at least based on biometric information of a person. Such biometric information may comprise more than one type of biometric information including characteristics of the person's voice, overall appearance and details, motion, mannerisms, and other forms of biometric characteristics that can be captured and formed into an overall digital replica of the person. A digital identity as described herein may consist of or be based on numeric or alphanumeric identifiers assigned to a person by a government or organization, and/or one or more of a likeness, voice, movement and other biometric data originating from a human, though other definitions of digital identity exist for contexts outside of the descriptions herein. A digital watermark as described herein may consist of or be based on a unique, imperceptible, and permanent marker embedded in a digital media file that identifies provenance, ownership, and/or usage rights for the digital media file.

The provisional applications upon which this non-provisional application is based describe one or more framework (s) for safeguarding the digital identities of humans, with the core example being SAG-AFTRA performers. For the purposes of this patent, SAG-AFTRA performer data is being used as an example, but the paradigm serves as a model for all other industries. Building upon the noted prior provisional patent applications, this document introduces advancements in the digital watermarking schema and identity management, including the use of a decentralized and immutable ledger.

With the advent of artificial intelligence (AI) and its increasing involvement in the entertainment industry, there is a critical need for a robust mechanism to (1) protect, (2) manage, and (3) monetize digital identity use on behalf of performers. This system addresses such a need through an intricate network of digital watermarking, verification which may include use of a blockchain, consent matrices, and automated systems such as smart contracts, which together ensure the secure and ethical use of performers' digital replicas.

Along with SAG-AFTRA examples, a Healthcare example (see Table 1.2) has been provided to demonstrate the broader utility of the watermarking and tracking technology. However, many business sectors can be served by the digital identity authentication, protection, and management outlined herein, including healthcare, government, military, banking, energy, real estate, agriculture, education, transportation, information, and more.

According to an aspect of the present disclosure, a system for controlling output of digital content representing identity of a human includes a memory that stores instructions; and a processor that executes the instructions. When executed by the processor, the instructions cause the system to: obtain a digital content file; search at least one predetermined location of the digital content file for at least one portion of an embedded watermark; if the at least one portion of the embedded watermark is found, determine whether output of the digital content is authorized based on the embedded watermark and, if output of the digital content is authorized, allowing output of the digital content; and if the embedded watermark is not found or if output of the digital content is not authorized, not allowing output of the digital content.

According to another aspect of the present disclosure, a system for securing digital content representing identity of a human includes a memory that stores instructions; and a processor that executes the instructions, the instructions comprising a watermarking program. When executed by the processor, the instructions cause the system to: create a first digital watermarking schema comprising a unique identifier that uniquely identifies the first digital watermarking schema and a plurality of digital watermarking elements characterizing provenance of a digital content file; and embed the first digital watermarking schema into the digital content file with biometric characteristics of a human present in the digital content file, thereby creating a first watermarked digital content file; store in a ledger a clone of the first digital watermarking schema and a first consent matrix specifying authorized uses of the digital content file.

According to another aspect of the present disclosure, a method for managing digital identity using distributed ledger technology includes capturing biometric data across media formats for a digital identity; encoding the captured biometric data with metadata through a digital watermarking process; storing the metadata on a record system to create an immutable ledger of consent and usage rights; and automating enforcement of usage permissions.

According to another aspect of the present disclosure, a system for managing digital identity includes a memory that stores instructions; and a processor that executes the instructions. When executed by the processor, the instructions cause the system to encode biometric data for digital watermarking; and store recording consent and usage rights in a record system, wherein the recording consent and usage rights are stored in the record system as a consent matrix along with the encoded biometric data for outlining usage permissions.

BRIEF DESCRIPTION OF THE DRAWINGS

The example embodiments described herein are best understood from the following detailed description when read in context with the accompanying drawing figures. The various features are not necessarily drawn to scale unless otherwise noted. The dimensions may be arbitrarily increased or decreased for clarity of discussion. Wherever applicable and practical, like reference numerals refer to like elements.

DETAILED DESCRIPTION

Figure 1A:
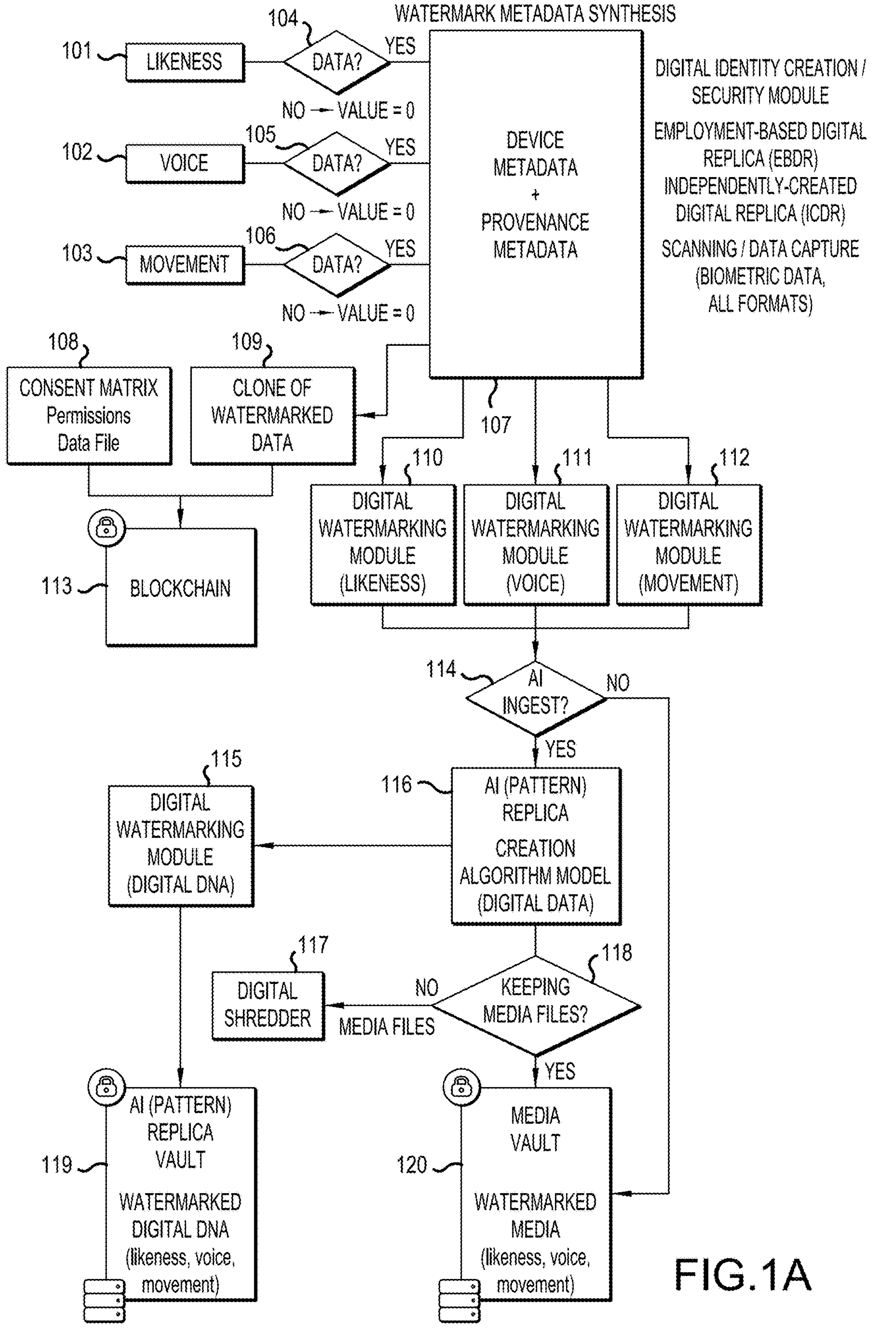
FIG. 1A: illustrates a hybrid process and system for creating and storing a digital identity, according to an aspect of the present disclosure.

In the following detailed description, for purposes of explanation and not limitation, representative embodiments disclosing specific details are set forth in order to provide a thorough understanding of the representative embodiments according to the present teachings. However, other embodiments consistent with the present disclosure may depart from specific details disclosed herein. Descriptions of known systems, devices, methods of operation and methods of manufacture may be omitted so as to avoid obscuring the description of the representative embodiments. Nonetheless, systems, devices and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed herein could be termed a second element or component without departing from the teachings of the present disclosure.

As used in the specification and appended claims, the singular forms of terms 'a,' 'an' and 'the' are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

In view of the foregoing, the present disclosure, through one or more of its various aspects, embodiments and/or specific features or sub-components, is thus intended to bring out one or more of the advantages as specifically noted herein.

The present disclosure delineates a method for scanning and capturing biometric data across various media formats, constructing an Employment-Based Digital Replica (EBDR) and/or an Independently Created Digital Replica (ICDR). Each digital replica may be encoded with metadata through a digital watermarking process and may be governed by a consent matrix that specifies usage permissions such as authorized uses of a digital content file to determine whether reproducing output of the digital content file is authorized. The metadata may be comprehensive. The metadata and consent matrix may be stored in a secure memory such as on an immutable blockchain, providing an unalterable record of consent and usage that is transparent and verifiable. Digital watermarking schemas described herein for the digital watermarking process are examples, and such examples do not comprehensively include all types of digital watermarking schemas which may be used consistent with the teachings herein. EBDR and ICDR information may be found in the SAG-AFTRA Memorandum of Agreement on AI at pages 60-75.

One aspect of the systems described herein is the interplay between the consent matrix and smart contracts. Smart contracts described herein may refer to automated processes that are initiated and performed by multiple devices and/or systems which interact with one another, such as in a decentralized autonomous organization (DAO) or another type of networked arrangement. This relationship automates the enforcement of usage permissions, thereby streamlining the authorization process in the SAG-AFTRA performer example: for employing digital replicas in interactive (game) encounters, streaming services, media creation, and other digital content distribution models.

Furthermore, the system provides an approach to digital watermarking that goes beyond simple image or audio tagging, integrating performer-specific identifiers that comply with industry standards and legal requirements. This integration ensures that each instance of a digital replica's use is not only authorized but may also be recorded and made monetizable, opening new revenue streams for performers and providing an audit trail for rights management. While the present disclosure refers largely to performers as the subject who are the basis of digital replicas, digital replicas may be generated and used for any human including doctors, nurses, politicians, children, and other individual humans whose digital replica must be protected from misuse and/or exploitation.

The teachings herein describe the foundation for a comprehensive digital rights management platform that respects and reinforces the value of performers in the digital domain, empowering them with control over their digital personas and ensuring consent and fair compensation for their use.

A system described herein may assign identifiers that already exist to a digital watermark that is embedded in one or more digital media item(s). For example, a system described herein may assign a SAG-AFTRA name and/or identification number or, in the case of a doctor, the doctor's name and license number. A system described herein may assign unique digital identities to entities (e.g., SAG-AFTRA performers or other humans) and digital media items. A system may employ an advanced watermarking process for watermarks embedded within the media content, capturing biometric and performance data, to ensure traceability and rights management. Utilization of a distributed ledger may enable transparent and secure logging of transactions related to the use of digital identities.

Advantages of the system describe herein may include the prevention of unauthorized use of digital likenesses, capabilities for real-time monitoring, auditing and enforcement, seamless adaption to various media formats and distribution channels, and accurate attribution and compensation for performers.

Architectural Framework of Digital Identity Management

The description of the architectural framework explains the various components and processes involved in the creation, verification, and management of digital replicas.

In the contemporary digital ecosystem, the provenance and authenticity of a performer's digital identity are paramount in order to protect against misuse, confirm consent, and manage/monetize on behalf of the performer. The architectural framework, as depicted in FIG. 1A: provides a schematic representation of the intricate system designed for the creation, preservation and utilization of digital replicas from humans.

An example definition of a digital replica has been proposed in the 2024 NO FAKES act in the United States Congress, wherein section 2 reads as follows:

> SEC. 2. VOICE AND VISUAL LIKENESS RIGHTS. (a) DEFINITIONS.—In this section: (1) DIGITAL REPLICA.—The term "digital replica" means a newly created, computer-generated, highly realistic electronic representation that is readily identifiable as the voice or visual likeness of an individual that—(A) Is embodied in a sound recording, image, audiovisual work, including an audiovisual work that does not have any accompanying sounds, or transmission—(i) In which the actual individual did not perform or appear; or (ii) That is a version of a sound recording, image, or audiovisual work in which the actual individual did perform or appear, but where the fundamental character of the performance or appearance has been materially altered; and (B) Does not include the electronic reproduction, use of a sample from one sound recording or audiovisual work into another, remixing, mastering, or digital remastering of a sound recording or audiovisual work authorized by the copyright holder.

In this document, a "scan" denotes any ingestion of a person's likeness, voice, or movement into media. The scan creates a digital replica of the person, whether the digital replica remains in the form of media or is converted into an algorithm such as a neural network pattern. A digital replica may be or include a video, an image, a sound file, a 3D model, a data set ingested into a generative artificial intelligence (GAI) model, or other types of data which are based on a human. The initial phase in the creation of a digital replica involves the data capture of a performer's biometric attribute(s). For a given ingestion, many pieces of biometric data may be recorded (such as a video with likeness, voice, and movement data), or only one type may be recorded (such as audio files with only voice data). The diagram of this process in FIG. 1A is meticulously engineered to cover current formats, though the process in FIG. 1A may be altered as appropriate for formats developed in the future.

Figure 6:
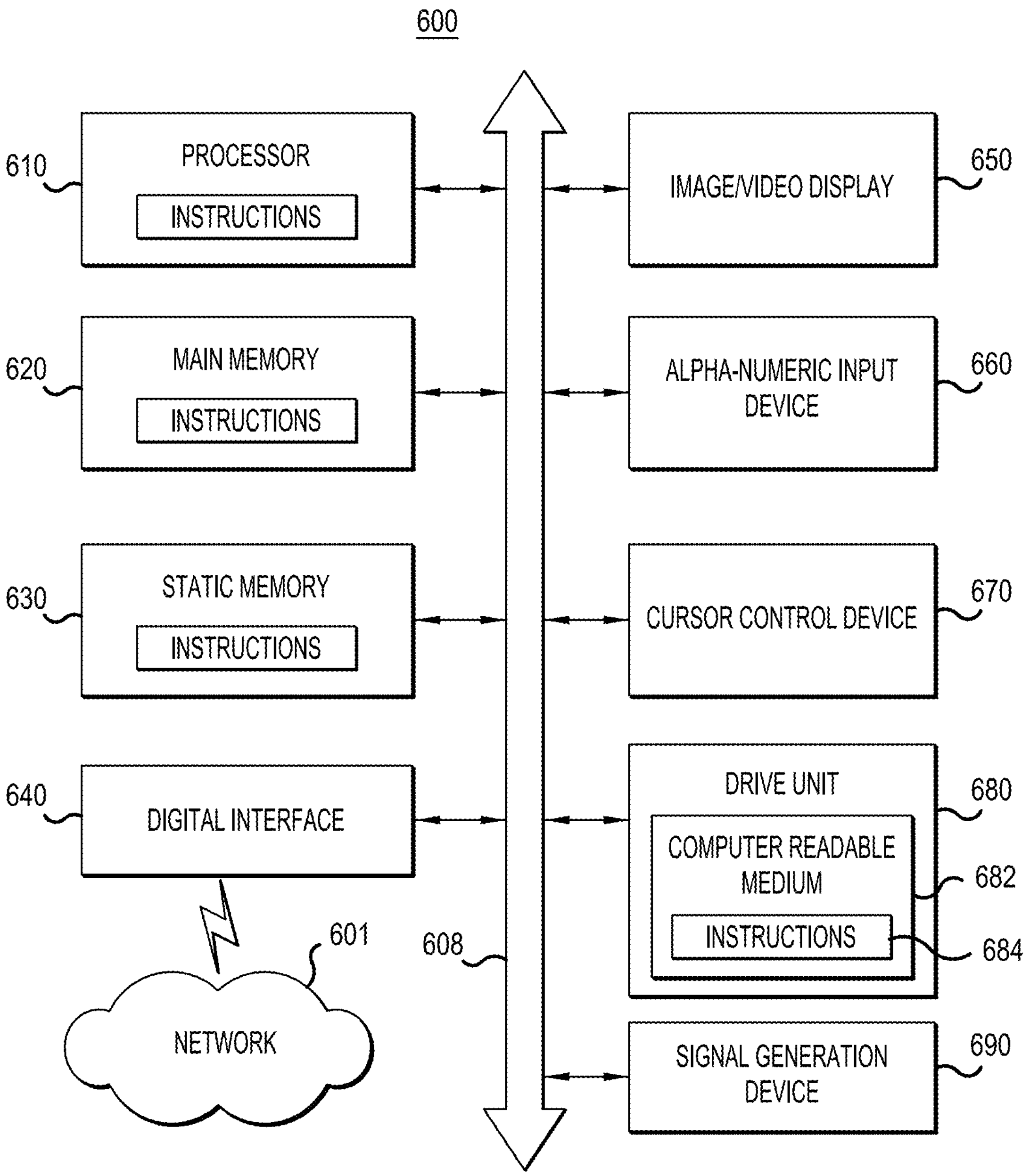
FIG. 6 illustrates a computer system representative of electronic devices by which systems described herein may be implemented, in accordance with another representative embodiment.

Before describing the FIGS, it should be clear that systems described herein may be built using electronic devices with processor and memory combinations. An example of an electronic device is shown in FIG. 6 as described below. However, a network of physically different systems may be built to implement the teachings herein, including secure memory that is effectively disconnected from the internet by isolating virtual clean rooms and storage of digital identities from direct internet access.

FIG. 1A: illustrates a hybrid process and system for creating and storing a digital identity, according to an aspect of the present disclosure.

The scanning and/or data capture in FIG. 1A starts with obtaining a likeness at 101 and/or a voice at 102 and/or movement at 103. At 104, a determination is made as to whether a likeness captured at 101 is data, and if not (104=No), the output value is set to null (i.e., 0), whereas if it is (104=Yes), the process proceeds to 107 as described below. At 105, a determination is made as to whether a voice captured at 102 is data, and if not (105=No), the output value is set to null (i.e., 0), whereas if it is (105=Yes), the process proceeds to 107 as described below. At 106, a determination is made as to whether movement captured at 103 is data, and if not (106=No), the output value is set to null (i.e., 0), whereas if it is (106=Yes), the process proceeds to 107 as described below.

At 107, a watermark schema is synthesized with metadata from the data determinations at 104, 105 and/or 106. The synthesis may include combining device metadata and provenance metadata from the data determinations at 104, 105 and/or 106. At 109, a clone of the watermarked data is generated, and at 108 a consent matrix with permissions for the data file is generated. The consent matrix and clone of the watermarked data are stored in a secure memory such as on a blockchain.

At 110, a digital watermarking module watermarks likeness from 101. At 111, a digital watermarking module watermarks a voice from 102. At 112, a digital watermarking module watermarks movement from 103. At 114, a determination is made as to whether any of the biometric data from 101, 102, 103 is to be ingested by AI, and if not (114=No), the watermarked biometric data is stored in a media vault at 120. If any of the biometric data from 101, 102, 103 is to be ingested by AI (114=Yes), at 116 an AI model creates a replica of the biometric data from 101, 102, 103. At 118, a determination is made as to whether the AI replica from 116 is to be kept as media files, and if so (118=Yes), the media files are stored in the media vault at 120, whereas if not (118=No), the media files are input to a digital shredder that ensures there is no record of any media files created at 116.

At 115, a digital watermarking module 115 digitally watermarks any AI replica created at 116. And at 119, the watermarked AI replica is stored in an AI replica vault that stores watermarked digital biometric data from the AI replica created at 116.

Figure 1B:
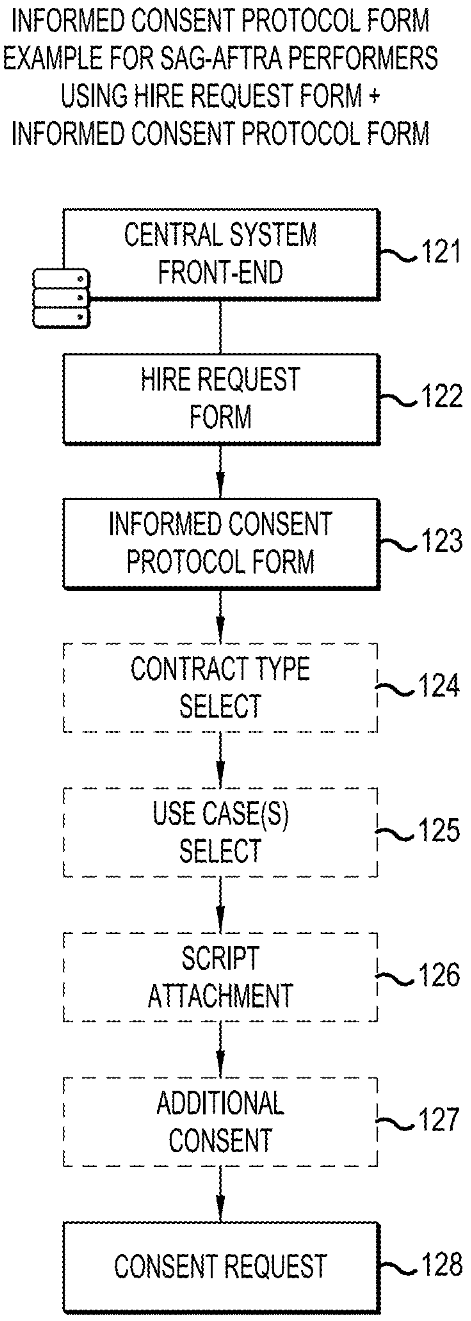
FIG. 1B: illustrates a hybrid process and system for obtaining informed consent for use of a watermarked digital replica, according to an aspect of the present disclosure.

FIG. 1B: illustrates a hybrid process and system for obtaining informed consent for use of a watermarked digital replica, according to an aspect of the present disclosure.

As a SAG-AFTRA example, in order to protect performers, the entire process should be considered modular to accommodate new formats as technology evolves. Current scanning formats include: (image).JPG, PNG, TIFF, .PDF, etc., (video) .MOV, MP4, H.264 ProRes, etc. (audio) .WAV, .AIFF, .MP3, FLAC, etc., (3d) USD, .MB, .MAX, .FBX, and (movement) .FBX, .BVH, .C3D, etc.

Biometric data of a person may be captured at a studio and then used to watermark digital content files that include biometric characteristics of the person. Biometric characteristics may include likeness, voice, movement, and/or other types of biometric characteristics. Captured biometric data may be preprocessed to ensure quality and consistency, such as to filter out outliers that do not meet expected thresholds. Relevant features may be extracted from the preprocessed biometric data. The extracted relevant features may be synthesized with additional metadata, such as unique identifiers, timestamping information, and provenance data. The synthesized metadata may be encrypted using a secure cryptographic algorithm. Comprehensive metadata may be used to encode captured biometric data through a digital watermarking process, and used to mark digital content files containing the captured biometric data. The encrypted metadata may be securely stored along with the associated digital replica comprising or at least based on the biometric data of the person. Access to the digital replica and the associated metadata may then be provided based on predefined permission matrices and access control policies.

Biometric data capture may involve capturing a person's biometric data such as facial features, voice, movements in a studio setting. The captured biometric data may be a singular type such as voice, or may be multiple types such as facial features, voice, movements. In some embodiments, traditional forms of biometric data such as fingerprints and/or retina scans may also be captured. In some embodiments, DNA, health information and/or other medical information may also or alternatively be captured. This captured data may be used to create a digital replica of the person.

Preprocessing and feature extraction may involve the captured biometric data undergoing preprocessing to ensure quality and consistency. Relevant features are extracted from the preprocessed data to create a more compact and efficient representation of the person's biometric characteristics. When the biometric characteristics are provided as a large dataset, the biometric characteristics may be automatically reduced to the extent possible by locating key data items in the dataset. In some embodiments, standards may be developed to specify which data items are key and should be included in the relevant features extracted from the preprocessed data. This reduction in amounts of data is particularly relevant for visual data such as images and videos. As an example, a sound engineer may record a voice. The voice is captured as an analog signal via a microphone and converted via analog-to-digital converters (ADCs) into a digital signal. The digital signal may be input to a processing program for editing as a form of a post-production flow.

Metadata synthesis nay include combining the extracted biometric features with additional metadata, such as: unique identifiers (e.g., a specific code assigned to the digital replica), name(s), ID number(s), timestamping information (to record when the digital replica was created), and provenance data (to track the origin and history of the digital replica). This metadata provides important context and helps to establish the authenticity and traceability of the digital replica.

Various types of data described herein may be securely stored, such as when encrypted and stored in an encrypted form. As an example, a copy of the synthesized metadata (biometric features and additional metadata) may be encrypted using a secure cryptographic algorithm to protect the copy from unauthorized access or tampering. The metadata may be encrypted and whether encrypted or not may be securely stored as part of the associated digital replica, which is based on the original biometric data of the person. A system for managing digital identity may execute instructions to encode biometric data for digital watermarking, store recording consent and usage rights in a record system. The recording consent and usage rights may be stored in the record system as the consent matrix along with the encoded biometric data for outlining usage permissions. The consent matrix is enforced based on the storage with the encoded biometric data.

In some embodiments, metadata and digital content may not necessarily be encrypted, depending on the context. In other embodiments, some types of data may be encrypted. For example, data items such as the UUID and assigned identifications from financial institutions and unitions may be encrypted consistently in order to ensure other parties do not know what is included in a watermark. In most embodiments described herein, presentation of an entire digital watermark to a blockchain without a consent matrix will not result in authorization or access. However, in some cases, a consent matrix may at least theoretically provide unrestricted consent, so that presentation to a blockchain will always result in authorization or access. Provenance information should be publicly accessible while sensitive data is maintained securely. The systems described herein may be adaptable to be compatible and compliant with future standards for content provenance information.

An example definition of a watermark is provided in the CONTENT ORIGIN PROTECTION AND INTEGRITY FROM EDITED AND DEEPFAKED MEDIA ACT (COPIED ACT) in the United States Congress in 2024, wherein section 3, item 12 reads as follows:

(12) WATERMARKING.—The term "watermarking" means the act of embedding information that is intended to be difficult to remove into an output, including text, images, audio, video, software code, or any other digital content or data, for the purposes of verifying the authenticity of the output or the identity or characteristics of its provenance, modifications, or conveyance.

A watermarking algorithm may be used to embed a watermark into a digital content file representing identity of a human, such as by including biometric characteristics of the human. A digital content file may include a unique identifier that uniquely identifies an embedded watermark, and one or multiple digital watermarking elements characterizing provenance of the digital content file. For example, the watermarking algorithm may divide a watermark into multiple portions of data, and then plate the multiple portions at multiple predetermined locations of the digital content file. For example, for a 64 byte×64 byte digital content file, portions of a watermark may be placed in a pattern at the $2^{nd}$ row and $2^{nd}$ column, the $2^{nd}$ row and $63^{rd}$ column, the $63^{rd}$ row and the $2^{nd}$ column, and the $63^{rd}$ row and the $63^{rd}$ column. That way, a system may know where to find the multiple portions of an embedded watermark at multiple predetermined locations of the digital content file in order to assemble the embedded watermark. In some embodiments, the watermark may be placed at one predetermined location, such as in the $2^{nd}$ row. In some embodiments, the watermark may be placed at dispersed (non-adjacent) locations. In other embodiments, some or all portions of a watermark may be placed at contiguous (adjacent) locations. The digital content file may also include biometric characteristics of a human present in the digital content file, such as image and/or voice attributes.

An application may be developed for devices to listen to or scan content, search for names of performers, project directors and writers, along with recordation dates and other types of contextual information. Digital provenance assurance may be outsourced to the public, analogous to a form of crowdsourcing. Cheating may be detected by capturing audio and/or video being played on a radio and/or television by an application on a device to see if watermarked provenance information on the device matches what is presented with the digital content from the radio and/or television. This form of crowdsourcing may be enforced by tens of thousands of motivated persons, such as SAG-AFTRA performers and their families and friends, as these persons may be enabled to use their smartphones to capture content on a radio and/or television at any time to see if distributors and content creators are adhering to contractual agreements.

A monetization gateway may be provided, analogous to using the Shazam application to crosscheck attribution information that should be detected when songs or commercials are being played on the radio. Of course, a verification application may also be used for the base functionality of simply identifying the name of a singer, a song, a movie, an actress, an actor, or other underlying information of the persons whose identity characteristics are being used to create content. Each time a user interacts with the verification application to identify content, the application may automatically send the watermarked provenance information and associated data back to the central server, contributing to the crowdsourced compliance monitoring described herein.

Access control and permissions may be implemented to control access to sensitive data as described herein. Access to a digital replica and associated metadata may be governed by predefined permission matrices and access control policies. These matrices and policies may determine who can access the digital replica, under what conditions, and for what purposes. This ensures that the use of the digital replica is carefully controlled and aligns with the intended permissions and consents.

An extensive metadata framework may be established to synthesize metadata with captured data. This metadata serves as the provenance information for the digital replica, embedding essential data from Table 1.1: Digital Watermarking Schema. Table 1.1 is produced below. Table 1.1 shows an example of provenance metadata for SAG-AFTRA, and may include or be based on biometric data in some or all available formats. A digital watermarking requirement may include some or all of the data schema in Table 1.1 to establish provenance and the digital identity of the person being scanned. The scanning of the performer may involve video, audio, motion capture, a three-dimensional (3D) scan, publicity photos, and/or other types of scanning.

TABLE 1.1

Digital Watermarking Schema

| Row | DATA | Description | Byte Size |
|---|---|---|---|
| 1 | UUID | A unique code to identify the digital media file | 16 |
| 2 | KYC ID (ID) | Know-Your-Customer ID | 16 |
| 3 | NAICS code | Industry-specific codes | 6 |
| 4 | SAG-AFTRA Name | Performer's name in characters | 22 |
| 5 | SAG-AFTRA ID | SAG-AFTRA identification assigned to performer | 4 |
| 6 | Project ID | A unique identifier for the project | 8 |
| 7 | Production Company | ID of the production company | 8 |
| 8 | Individual Responsible | Person responsible for creation/ distribution. | 8 |
| 9 | Timestamp of Ingest | Date and time when the media was captured | 8 |
| 10 | Location of Ingest | GPS coordinates where the media was recorded | 6 |
| 11 | Ingestor Name (ID) | Name of person who performed the media ingest | 8 |
| 12 | Ingestor Position | Type of professional role of the ingestor | 2 |
| 13 | Media Code | Type of media, duration, file format | 4 |
| 14 | DGA | ID assigned by Directors Guild of America | 4 |
| 15 | IATSE MPI Production | MPI health/pension plan ID for IATSE members | 4 |
| 16 | WGA | ID assigned by Writers Guild of America | 4 |

In Row 1 of Table 1.1, a UUID stands for a universally unique identifier, and may include as many as 16 bytes of data. As is known, each byte of digital data provides 256 variations, so that two bytes provide 65,536 variations, three bytes provide 16,777,216 variations, four bytes provide 4,294,967,296 variations and so on, so that 16 bytes of data provide essentially an enormous amount of potential identifiers. In Row 2, a KYC ID stands for a know your customer ID, and may be used for multi-factor authentication (MFA) of parties involved along with a contract completed-generated ID. A KYC ID may be used, for example, if a government regulates how a handshake is made and requires MFA and a KYC ID as a form of confirmation number. In Row 3, a NAICS code is a North American Industry Classification code such as 516210 for Subscription TV or 512210 for software publishers (interactive).

In Row 4, the SAG-AFTRA name may be the name of the performer in characters as also established by or for SAG-AFTRA. In Row 5, the SAG-AFTRA ID may be the identification assigned to the performed by SAG-AFTRA, such as a numerical or alphanumerical identification. In Row 6, the project ID may be assigned for the project by the production company. In Row 7, the production company may be an identification (ID) for the production company responsible for the project, and may include, for example, a company name, a street address and/or website, and a phone number and/or email address. In Row 8, the Individual Responsible may be the name of the person responsible for the creation and/or distribution of the media, or an identification for the person such as a numerical or alphanumerical identification. In Row 9, the date and time may be provided in an ISO 8601 format. In Row 11, the Ingestor Name may be the name of a person who performed the media ingest or an identification for the person such as a numerical or alphanumerical identification. In Row 12, the Ingestor Position may be an identification for the type of professional role of the ingestor. An example role is as a cinematographer. In Row 15, the IATSE MPI Production number may be an identification number assigned to the MPI health/pension plan for the IATSE member benefits on the production. Other rows in Table 1.1 are more self-explanatory.

For Table 1.1 above, total bytes may vary from what is shown, though 128 bytes is a logical target given each processor or core of a multi-core processor may be provided with 16 64-bit (i.e., 8-byte) registers for operations. Total bytes may vary if there is more than one ingestor, director or writer working on the project. For example, multiple ingestors may include a cinematographer and a sound department. Sample media formats used in the entertainment industry include RAW, .JPG, PNG, TIFF and PDF for images; USD, .MB, .MAX, and .FBX for 3D; WAV, .AIFF, and .MP3 for audio; .MOV, .MP4, H.264, ProRes, and R3D for video; and .FBX, .BVH, .C3D, TRC, and .MOT for movement.

The primary example described in this disclosure is SAG-AFTRA, but this juncture is where different business models may require different digital watermarking standards. For the SAG-AFTRA example, metadata may include, for example, UID, performer name, SAG-AFTRA ID, project ID, production company responsible, etc. This provenance metadata may be combined with device metadata and sent to the watermarking modules. The two kinds of metadata combined in this step are device metadata and digital provenance metadata. Device metadata is from the recording device itself, whether it be video, photographic, audio, etc. Common metadata formats include: EXIF (Exchangeable Image File Format), IPTC (Int'l Press Telecom Council), XMP (Extensible Metadata Platform) ID3 tags, BWF (Broadcast Wave Format), Vorbis comments, and more. Digital provenance metadata in the SAG-AFTRA example (see Table 1.1: Digital Watermarking Schema) may be completed and submitted to the digital watermarking system before ingesting in the creation of a EBDR or an ICDR after KYC/authentication agreement. Examples of digital provenance metadata include UUID (universally unique identifier), KYC ID (know your customer ID), NAICS code (North American Industry Classification System code), performer SAG-AFTRA name, project ID, production company, responsible contact ID, individual responsible ID, timestamp of ingestion (ISO 8601), location of ingestion (GPS coordinates), ingestor name, ingestor position (type), media code, DGA ID, or WGA ID.

To maintain the integrity of the digital replica, an advanced digital watermarking process is incorporated for each type of data of a digital identity (e.g., numeric or alphanumeric identifier, likeness, voice, and/or movement). This module embeds the metadata onto the media as imperceptible identifiers, facilitating tracking and authentication of the media content.

A digital watermarking schema for protecting digital content across different industries may include generating a unique identifier for each piece of digital content. The universally unique identifier may be generated based on a combination of industry-specific metadata and timestamping information. A watermarking algorithm may embed the universally unique identifier (UUID) for the digital content into the digital content in a manner that is imperceptible to human senses but detectable by specialized software. A storage system may securely store the watermarked digital content along with the watermarking data schema that includes the associated universally unique identifier (UUID). An authentication process may verify the integrity of the watermarked digital content by comparing the embedded universally unique identifier with the stored identifier in the consent matrix. An access control mechanism may grant or deny access to the watermarked digital content based on the permissions specified in the associated consent matrix.

The digital watermarking schema consists of a variety of features. Unique identifier generation is performed by assigning each piece of digital content a unique watermark with a unique identifier and typically other provenance information such as shown in Table 1.1. The unique identifier may be generated based on a combination of industry-specific metadata (information relevant to the particular industry), and time/geolocation stamping information (to record when/where the identifier was created). This unique identifier serves as a singular locator for the digital content. A watermarking algorithm is used to embed the unique watermark with the unique identifier into the digital content. The watermarking algorithm may be activated based on responses to a consent matrix once consent to use the underlying identity is received. For example, a watermarking program may be executed by a processor at a system for securing digital content representing identity of a human. The watermarking program may create digital watermarking schemas each comprising a unique identifier that identifies the corresponding digital watermarking schema and a set of digital watermarking elements characterizing provenance of a digital content file, embed the digital watermarking schema into the digital content file with biometric characteristics of a human present in the digital content file, to thereby create a watermarked digital content file. A clone of the digital watermarking schema may be stored in a secure memory such as a blockchain ledger, along with a consent matrix specifying authorized uses of the digital content file. A ledger comprising blockchain may comprise a distributed blockchain architecture of a plurality of blockchain nodes, each blockchain node storing a copy of a ledger containing watermarked identity datasets and permission matrices containing conditions for using digital content files watermarked by watermarking schemas. Access for use of the digital content file may be granted if a requested use is subsequently authorized by the consent matrix when requested use is accompanied by a corresponding digital watermarking schema embedded in the watermarked digital content file is extracted and compared with the clone of the digital watermarking schema. A use type may be identified in order to verify whether a requested use is authorized by the consent matrix.

Figure 3A:
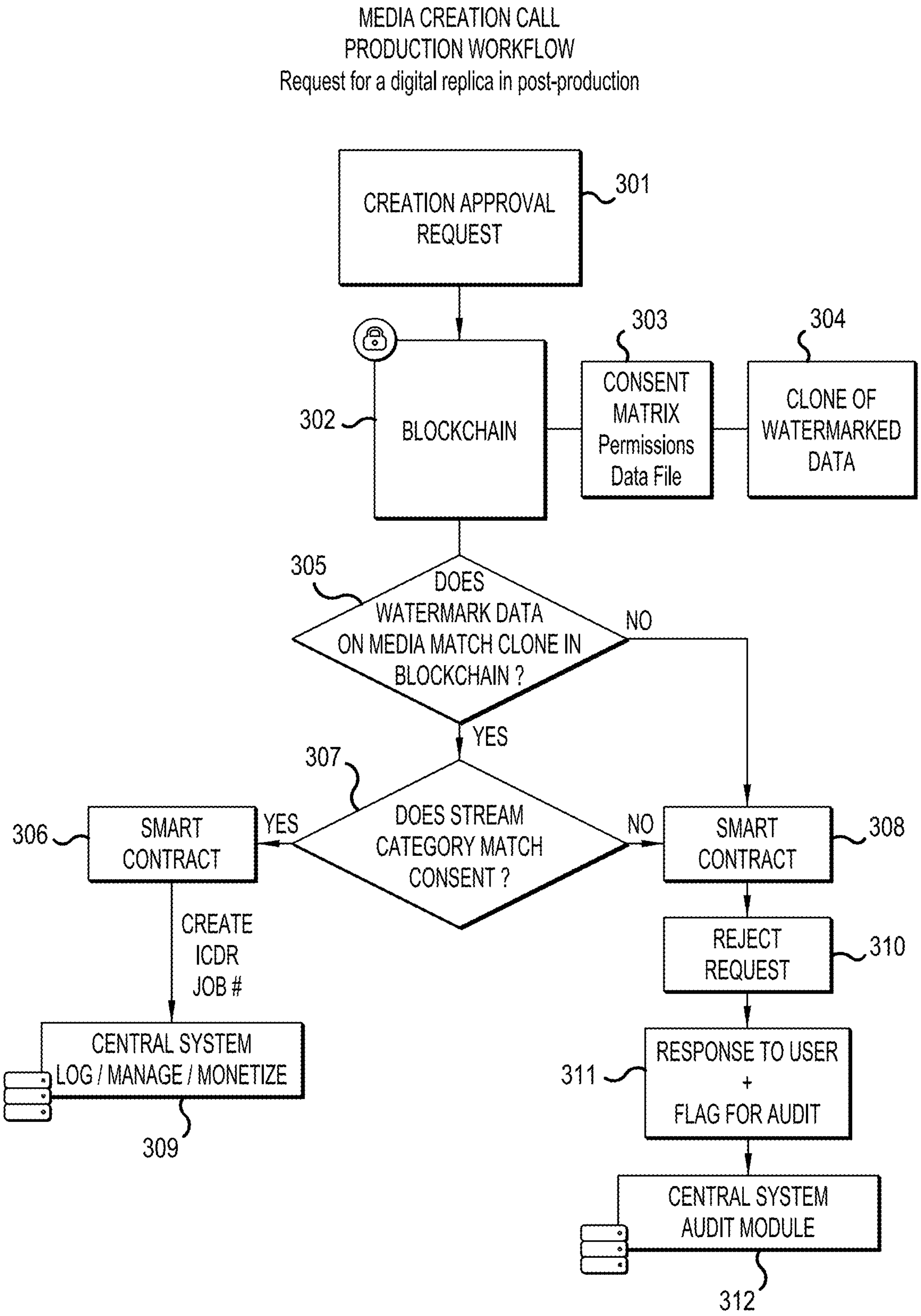
FIG. 3A: illustrates a hybrid process and system for obtaining approval for creating media based on a digital replica, according to an aspect of the present disclosure.

FIG. 3A: illustrates a hybrid process and system for obtaining approval for creating media based on a digital replica, according to an aspect of the present disclosure.

At 301 in FIG. 3A, a creation approval request is initiated. At 302, the request from 301 is provided to the blockchain to retrieve or otherwise refer to a consent matrix at 303 and a clone of watermarked data at 304.

At 305, a determination is made as to whether watermarked data or media match the clone in the blockchain. If there is a match at 305 (305=Yes), at 307 another determination is made as to whether the stream category matches consent from the consent matrix. If there is no match at 305 (305=No) or at 307 (307=No), a smart contract is generated at 308 to reject the request at 310 and a response is sent to the user and the request is flagged for audit at 311. A record of the rejected request is stored in an audit module of a central system at 312.

If there are matches at 305 (305=Yes) and 307 (307=Yes), a smart contract is generated and a job # is created and stored for the request at 309.

Figure 3B:
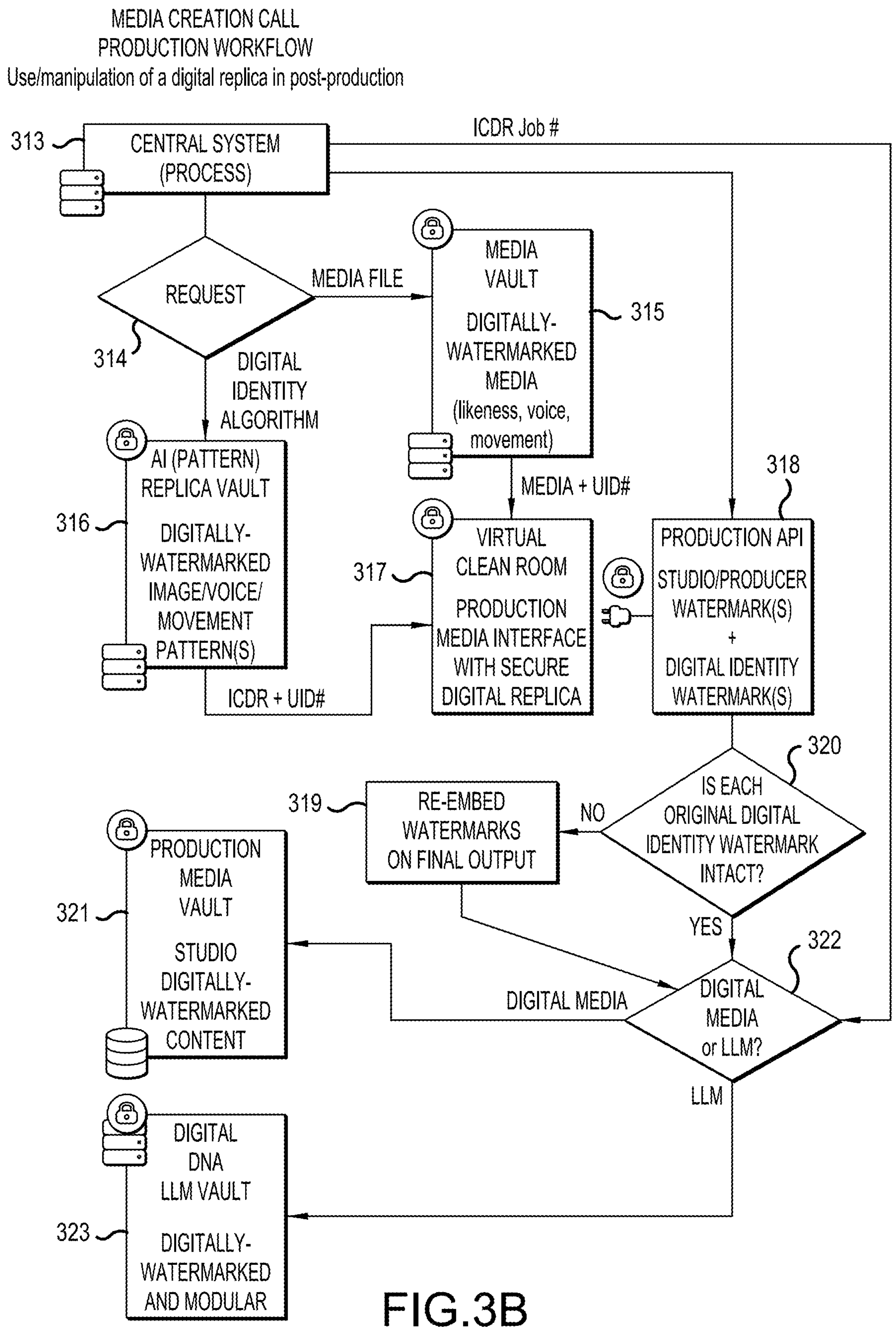
FIG. 3B: illustrates a hybrid process and system for producing media content using approved digital replicas, accordingly to an aspect of the present disclosure.

FIG. 3B: illustrates a hybrid process and system for producing media content using approved digital replicas, accordingly to an aspect of the present disclosure.

In some embodiments, a derivation system may use the consent matrix for creating authorized derivations of a digital content file. When a request to create a derivation is received, the derivation system may grant access if the request is authorized. The access to the watermarked digital content may be granted for use in a clean room environment, and used to create another digital watermarking schema. The watermarked derivation of the first watermarked digital content file may have a second digital watermarking schema embedded therein, and subsequently released from the clean room environment after being created.

At 313, a central system process may generate a request. At 314, a determination is made as to whether the request is for a media file or for a digital identity algorithm. If the request at 314 is for a media file, the request is provided to a media vault at 315 for digitally watermarked media such as biometric data of a likeness, voice and/or movement, and the digitally watermarked media is provided to a virtual clean room at 317. If the request is for a digital identity algorithm, at 316 the request is sent to an AI replica vault to retrieve a digitally watermarked biometric data of image, voice or movement patterns, and these are provided to a virtual clean room at 317.

At 318, a production API is plugged in to the virtual clean room. After the production API is applied at 318, a determination is made at 320 as to whether each original digital identity watermark is intact. If not (320=No), watermarks are re-embedded on the final output from the virtual clean room at 319. If the original digital identity watermarks are intact (320=Yes), or otherwise after 319, a determination is made as to whether the final output is digital media or a large language model (LLM). A digital media is stored in a production media vault at 321. A LLM is stored in a digital DNA LLM vault at 323.

At 313, the central system may also output an ICDR Job # directly for processing at 322.

The process in FIG. 3B is for a media creation call for a production workflow, and may involve the use or even manipulation of a digital replica in post-production.

The watermark, or pieces of the watermark, described herein may or may not be encrypted. The watermark is designed to be imperceptible to human senses, meaning it does not affect the visual or auditory quality of the content. This aspect of being unperceivable may also apply to all provenance data, and not just the UUID. Provenance data may be made unperceivable without a specialized application designed to fine the provenance data. However, the watermark is detectable by specialized software, allowing for the identification and tracking of the digital content. The watermarked digital content is securely stored in a storage system. The consent matrix may also be securely stored. Along with the watermarked content, the storage system also stores: the associated watermark with the unique identifier, and the consent matrix. As described herein, the consent matrix is a set of rules defining who can access the content and under what conditions. The secure storage ensures that the watermarked content and its related information are kept together and protected.

When a cooperative system attempts to access or use the watermarked digital content, an authentication process is triggered through an application that "phones home." An example of a cooperative system is a player such as a computer, smartphone, or smart television, or a system at a broadcaster such as a cable company or over the air (OTA) broadcaster. In some embodiments, the process may find the correct record system (e.g., blockchain) via matching UUIDs and then comparing watermarks to ensure the watermarks are identical or at least substantially identical. If the watermarks are identical, the permission matrix is reviewed to ensure use is authorized for the particular context requested. Identifiers that match will confirm that the content has not been tampered with and is authentic. A cooperative system may control output of digital content representing identity of a human, and may include a memory that stores instructions; and a processor that executes the instructions. When executed by the processor, the instructions may cause the system to: obtain a digital content file such as when obtaining one from a library or over the internet: search at least one predetermined location of the digital content file for at least one portion of an embedded watermark; if the at least one portion of the embedded watermark is found, determine whether output of the digital content is authorized based on the embedded watermark and, if output of the digital content is authorized, allow output of the digital content; and if the embedded watermark is not found or if output of the digital content is not authorized, not allow output of the digital content. The predetermined location(s) may vary based on the format of the digital content, or may be dynamically varied according to a known algorithm that varies locations of the portion(s) of the embedded watermark, similar to a private key or a phase shifting algorithm for wireless communications.

An access control mechanism is put in place to govern who can access the watermarked digital content and under what circumstances. The access control mechanism uses the permissions specified in the associated consent matrix to grant or deny access to the content. This ensures that only authorized individuals or systems can access the watermarked content, based on the predefined rules and conditions.

The backbone of the system's security protocol may be the use of a blockchain integrated with the digital identity features. Each digital identity may be paired with a unique blockchain entry, ensuring an immutable ledger of consent and usage rights, which is transparent and tamper-proof.

A dynamic consent matrix may be central to the system, outlining the permissions and restrictions associated with each digital replica. The terms of usage are defined in a consent matrix, and are agreed upon, and cryptographically sealed. A breakdown of the consent matrix module described above and shown in FIG. 1B: Informed Consent Protocol Form. Production and casting may present a production form for a specific production in view of a consent matrix for a booking when they fill in the informed consent protocol form in FIG. 1B and the performer agrees. The production form may specify a production that a performer, and the performer's digital replica, are being hired for. The production form may specify that the performer and performer's digital replica are being turned into an AI host, as an example, and the production form may be sent. The process of using a dynamic consent matrix may be integrated with common devices such as IPhones and other smartphones. All outgoing content from the devices may be automatically digitally watermarked and users may be enabled to set granular consent parameters in their device preferences including, for example, platform-specific permissions, content restrictions, authenticity preservation, commercial use requirements and more. These examples may include both manifest disclosures and latent disclosures, and provide a mechanism for public verification of content authenticity and adherence to potential future standards.

Secure digital vaults store the digital replicas and may include storage in data centers, distributed storage solutions, and on-site storage solutions. Any and all media files may be either stored in a vault or permanently erased. If an AI pattern is created, the AI pattern is watermarked and put into a separate vault. Access to these vaults is stringently controlled, with entry only granted under compliance with the established consent parameters.

The digital watermarking schema (see example Table 1.1 and Table 1.2) may be integral to a digital identity management system, is meticulously designed to be industry-agnostic, providing essential protection and traceability to various sectors. This section outlines, as two examples, the application of the watermarking schema in two key industries: entertainment and healthcare.

For the entertainment industry, particularly concerning the members of SAG-AFTRA, the digital watermarking schema encodes critical provenance metadata into every piece of media content. This includes unique identifiers like the performer's name, SAG-AFTRA ID, and project details. The metadata also captures the terms of the content creation, such as the timestamp of ingestion and the location of content capture, ensuring every use of a performer's digital identity is traceable and authorized.

In the healthcare industry, the watermarking schema is utilized to protect patient data within digital media files. It embeds a unique set of identifiers, such as the patient ID, provider ID, and encounter information. This ensures that each piece of media, whether it is a scan, a recording, or any digital capture of a medical procedure, carries a secure, traceable link to its origin, protecting doctors from deepfakes, safeguarding patient confidentiality and compliance with regulatory standards. Table 1.2 is produced next. Table 1.2 shows an example of a digital watermarking schema for provenance metadata for the medical industry such as hospitals, and may include or be based on biometric data in some or all available formats. A digital watermarking requirement may include some or all of the data schema in Table 1.2 to establish provenance and the digital identity of the person being scanned. The scanning of the patient or other person may involve photos, video, audio, motion capture, a three-dimensional (3D) scan, and/or other types of scanning.

TABLE 1.2

Digital Watermarking Schema

| Rows | DATA | Description | Bytes |
|---|---|---|---|
| 1 | UUID | A unique code to identify the digital media file | 16 |
| 2 | Patient ID | A unique identifier for the patient | 8 |
| 3 | Provider ID | The official ID of the healthcare provider or entity | 8 |
| 4 | NAICS code | Industry-specific code | 6 |
| 5 | MRN | Unique number assigned to patient's medical record | 8 |
| 6 | Encounter ID | Unique identifier for patient's visit or encounter | 8 |
| 7 | Procedure Code(s) | Standard medical code(s) | 5 |
| 8 | Diagnosis Code(s) | Standard medical diagnosis code(s) for the encounter | 5 |
| 9 | Consent Status | Indicator of patient consent for use of their data | 1 |
| 10 | Timestamp | Exact date and time when the media was captured | 8 |
| 11 | Location of Creation | GPS coordinates where the media was recorded | 6 |
| 12 | Care Team Member | ID of healthcare professional | 8 |
| 13 | Security Clearance | Minimum level to view/audit the patient data | 1 |
| 14 | Audit Trail ID | Link to a detailed audit trail | 8 |
| 15 | Compliance Codes | Specific codes indicating healthcare data compliance | 4 |

In Row 1 of Table 1.2, a UUID again stands for a universally unique identifier. In Row 2, a patient ID is a unique patient identification according to the healthcare provider or entity. In Row 3, a provider ID is an official identification of the healthcare provider or entity. In Row 4, the NAICS code is again North American Industry Classification code with an example of 622110 for hospitals, general medical and surgical or 621493 for urgent medical care centers and clinics. In Row 5, an MRN is a medical record number. In Row 6, an encounter ID is a unique identifier specific to the patient's visit or encounter. In Row 7, a procedure code is for procedures performed during the encounter. In Row 10, the date and time may be provided in an ISO 8601 format. In Row 12, the care team member ID may be the identification of the healthcare professional responsible for the data entry. In Row 13, the security clearance may be the minimum level of security clearance required to view, edit or otherwise access the patient's data. In Row 14, the audit trail may be an identification that links to a detailed audit trail of healthcare data entry and access for the patient data. In Row 15, the compliance codes may be regulatory compliance codes to indicate healthcare data compliance, such as for HIPAA. Other rows in Table 1.2 are more self-explanatory.

For Table 1.2 above, total bytes may vary from what is shown, though 120 bytes is lower than the logical target of 128 bytes given each processor or core of a multi-core processor may be provided with 16 64-bit (i.e., 8-byte) registers for operations. Sample media formats used in the entertainment industry include RAW, .JPG, PNG, TIFF and PDF for images; WAV, .AIFF, and .MP3 for audio; .MOV, MP4, H.264, ProRes and R3D for video.

The digital watermarking schemas described herein exemplify the system's scalability, demonstrating its capability to support a wide range of data types and formats. By integrating with existing industry standards and embracing future technological advancements, the system provides a versatile solution capable of adapting to the evolving needs of any sector, ensuring the digital provenance and integrity of identities remain intact.

A consent matrix build for a SAG-AFTRA example is diagrammed in FIG. 1B: Informed Consent Protocol Form. A central system front-end is likely the entry point where the request for a performer's digital identity is initiated. It should be a user-friendly interface for inputting and managing requests.

A hire request form is used at a stage that captures essential identification/production data.

An informed consent protocol form is a section that collects specific information about the project, such as the project ID, name, production company, and the individual responsible, providing clear context for the use of the digital identity.

FIG. 1B: illustrates a hybrid process and system for obtaining informed consent for use of a watermarked digital replica, according to an aspect of the present disclosure.

At 121, a front-end of a central system starts a process to generate a hire request form at 122, an informed consent protocol form at 123, a contract type selection at 124, a use case(s) selection at 125, a script attachment at 125, and additional consent at 127, to generate a consent request at 128. A contract type selection at 124 enables the user to select the appropriate SAG-AFTRA contract type that applies to the request, such as commercials, voiceover, etc., which sets the baseline for the terms of use. A use case(s) selection at 125 allows selection of specific use cases for which the performer's digital identity is being requested, which could include various media distributions like cable or internet. A script attachment at 126 provides a process that requires attaching the script, which must be approved by the performer to ensure they agree with the content their digital identity will be used for. An additional consent field at 127 involves obtaining consent for additional aspects not covered by standard contracts, such as the performance of stunts, portrayal of sensitive subject matter, or political content.

A contractual agreement relevant to the technologies described herein may be provided in the context of performers. Performers may be parties in two or more types of contracts, including a first contractual agreement with a production company or similar party, and a second contractual agreement between a union and one or more production companies or similar parties, on behalf of the performer. The second contractual agreement may be a global type of agreement, such as the Collective Bargaining Agreements (CBAs), that covers members of a union as a default for some types of commercial contracts, voiceover contracts, animation contracts, tv/film contracts, interactive contracts, etc. The first contractual agreement may fall under the second contractual agreement partly or fully. For example, a production company may hire an actor, and the first contractual agreement may include a SESSION RATE from the second contractual agreement, such as a rate for an actor to show up for a session. Then, residuals are calculated based on the second contractual agreement. For example, network residuals may be per-use, cable residuals may be periodic such as $12,000 for six months' usage, etc. For both session rate and residuals, the actor may be paid entirely on either a minimum scale established under the second contractual agreement, or higher amounts negotiated under the first contractual agreement. The terms of the first contractual agreement may be entered into the consent matrix for a particular item of digital content. Once the consent matrix is confirmed, the logic in networked devices may notify a collection point of the usage so that a RESIDUAL credit is generated for the actor. The value of the credit for the actor may be obtained from the consent matrix. These agreements and the consent matrix may also incorporate provisions for the use of digital replicas, including those of deceased performers.

Figure 2:
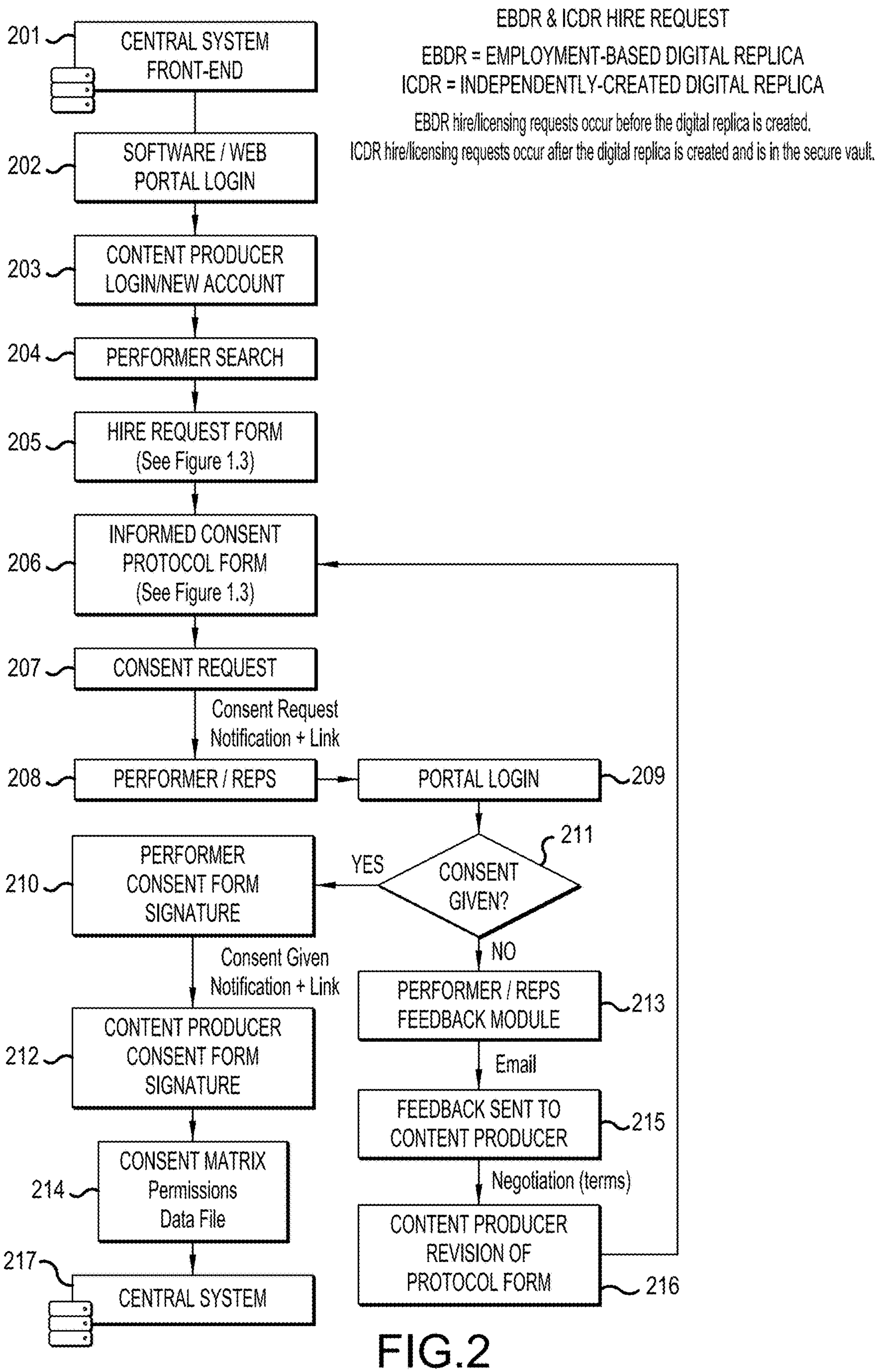
FIG. 2: illustrates a hybrid process and system for providing, establishing, and agreeing upon terms of consent for use of a watermarked digital replica, according to an aspect of the present disclosure.

FIG. 2: illustrates a hybrid process and system for providing, establishing, and agreeing upon terms of consent for use of a watermarked digital replica, according to an aspect of the present disclosure.

At 201, a front end of a central system initiates a process that includes a software/web portal login at 202, a content producer login or establishing a new account at 203, a performer search at 204, generating a hire request form at 205, and generating an informed consent protocol form at 206 to initiate a consent request at 207. The consent request is sent to the performer or the representatives of the performer at 208, and the performer or the representatives login to the portal at 209.

At 211, a determination is made as to whether consent is provided. If consent is provided, the performer consent form signature is provided at 210, content producer consent form signature is generated at 212, and a consent matrix 214 is updated to reflect the permissions. The updated consent matrix is stored to the central system at 217. If consent is not given (211=No), at 213 a feedback module provides the performer or representative feedback which is sent to the content producer at 215 for the content producer to revise the protocol form at 216 to return to 206 in the process.

A hire request protocol in FIG. 2 may be for employment-based digital replicas (EBDRs) and/or independently created digital replicas (ICDRs). EBDRs are hire/licensing requests that occur before the digital replica is created. An ICDR hire/licensing request occurs after the digital replica is created and is in the secure vault. The process of FIG. 2 provides a procedural infrastructure for requesting the creation of an Employment-Based Digital Replica (EBDR) with a performer and for the use of an Independently Created Digital Replica (ICDR). This protocol is crucial for ensuring that all usage of digital replicas is consensual and compliant with predetermined agreements.

The process begins with user interaction through a software or web portal login, establishing the first layer of security. Users must authenticate their identity, either by logging in to an existing account or by creating a new one, ensuring that only authorized entities can initiate a hire request.

Upon gaining system access, users can search for performers and/or deal memorandum numbers using the central system's front-end interface. The search functionality is designed to be comprehensive and user-friendly, allowing for quick and efficient navigation through the digital replica memory. As an example, if X Production Company and Y Agency have already worked out the deal, an agent may generate a deal memorandum number in the system, and the producer may search for the deal memorandum number in the system. The roles may be reversed. In another example, a producer may search for a performer by name without informing a performer's agent or the performer until afterwards.

Once a performer is selected, the user fills out a Hire Request Form, which captures all necessary details pertaining to the intended use of the digital replica. This form acts as an initial contract, laying out the scope of use, project details, and compensation terms.

For the example of SAG-AFTRA, see FIG. 1B: Informed Consent Protocol Form. The hire request may contain specific information about the project, e.g., project ID, project name, production company, individual responsible and duration of contract.

Central to the hire process is the informed consent protocol. See FIG. 1B: Informed Consent Protocol Form. A Performer/Representative Consent Form ensures that performers or their legal representatives are fully aware of and agree to the terms of the digital replica's usage. This consent is obtained through a secure and verifiable digital signature process. Informed consent may involve an interactive, branching questionnaire that expands based on user responses. The questionnaire may be used to capture granular, specific consent for various use cases of a performer's digital identity. This protocol follows four steps. In a first contract type select step, a producer selects which SAG-AFTRA contract the project falls under, including commercials, corporate/educational, dubbing, interactive, music videos, new media, news and broadcasts, television, theatrical, voiceover. In a second use cases select step, depending on the contract type, the producer selects how/where the content will be used. Examples for a Commercials contract include a national network cable, regular cable, streaming, internet, AVOD, national radio and regional radio. A third step described below is for compensation terms, and a fourth step is for script attachment. For the second step, a system for tracking the use of digital identities and enabling compensation may be implemented at broadcasters or other content providers, unions, third-party licensing on behalf of performers, and/or at end users. At an end user, the system for tracking may be implemented by or using a remote control, at a smart television, at a home router, at a home computer, at a digital radio, at a browser, at a set top box, or at an adjunct or plug-in for one or more of these types of example devices. At an end user, the system may be analogous to a Nielsen system, wherein representative end users are used to represent much larger user populations for use of content in which digital identity information is being tracked. Watermarked content may be detected and extracted from digital content to detect use of a watermarked identity. The system for tracking may record and report detected uses of the watermarked identity. Based on recorded uses and permissions specified in a consent matrix, the system for tracking may calculate the compensation due to the owner of the digital identity; and enable transfer of compensation to the owner of the digital identity.

The system may be implemented in a variety of ways. The tracking system can be implemented at the level of broadcasters and content providers, such as television networks, streaming platforms, or radio stations. These entities can integrate the tracking system into their content distribution infrastructure to monitor the use of digital identities in the content they deliver to end users. By embedding the tracking system at the source, broadcasters and content providers can ensure comprehensive and accurate monitoring of digital identity usage across their platforms. This may ensure that content creators cannot avoid paying residuals such as when acquiring content from other content creators. As an example, SAG-AFTRA or proxies may be enabled to audit digital content creators at the source and/or digital content once distributed.

The system may be implemented through third-party licensing on behalf of performers. A dedicated platform or marketplace can be established to facilitate the licensing of performers' digital replicas (ICDRs) to interested third parties, such as content creators, advertisers, or software developers. The platform would employ tracking technologies to monitor the use of licensed ICDRs across various media and ensure compliance with the terms of the consent matrix. As ICDRs are used by licensees, the platform would record and report usage data, calculate compensation owed to the performers based on the predetermined terms, and facilitate the distribution of payments. The platform would also provide a mechanism for resolving disputes, enforcing usage restrictions, and addressing any unauthorized use or infringement of performers' rights.

Compliance may be implemented at end users. The tracking system can also be implemented at the end-user level, allowing for granular tracking of digital identity usage on individual devices.

The system can be integrated into various end-user devices and platforms, including remote controls, smart televisions, home routers, home computers, digital radios, web browsers, set top boxes, and adjuncts or plug-ins for these devices. The system can be integrated into consumer devices and applications as set forth above that are configured to play content. By implementing the tracking system at the end-user level, it becomes possible to capture data on individual viewing habits, preferences, and engagement with content featuring digital identities. To efficiently track digital identity usage across a large user population, the system can employ a sampling approach similar to the Nielsen system used in television ratings. A representative subset of end users can be selected to have the tracking system installed on their devices, providing a statistically significant sample of the broader user population. The data collected from these representative end users can be extrapolated to estimate the overall usage patterns and engagement with digital identities across the entire user base.

The tracking system may rely on the detection and extraction of watermarks embedded in the digital content. If the watermarks match for the UUID of the digital content, the consent matrix is retrieved for a check of authorized use. When a user consumes content containing a watermarked digital identity, the tracking system detects the presence of the watermark and extracts the relevant information, such as the identity of the individual being represented and any associated usage rights or permissions. The watermark detection process can be performed in real-time as the content is being consumed or through periodic scans of stored content on end-user devices.

Once a watermarked digital identity is detected, the tracking system records the details of the usage event, including information such as: the specific content in which the digital identity appeared, the timestamp of the usage event, the duration of the digital identity's appearance, the device or platform on which the content was consumed. The value of the consumption may be predetermined or may be dynamically determined at a central computer based on type of consumption, location of consumption, date and time of consumption, and other factors. The recorded usage data is then securely transmitted to a central memory or reporting system for aggregation and analysis. The reporting system can generate insights and metrics on digital identity usage, such as audience reach, engagement levels, and demographic breakdowns, which can be valuable for content creators, advertisers, and other stakeholders.

Based on the recorded usage data and the permissions specified in the associated consent matrix, the tracking system can calculate the compensation owed to the owner of the digital identity.

The consent matrix defines the terms and conditions under which the digital identity can be used, including any applicable royalty rates, usage fees, or revenue-sharing agreements. The tracking system applies the relevant compensation formulas and algorithms to determine the amount owed to the digital identity owner based on factors such as the duration of use, the type of content, and the audience reach. Once the compensation amount is calculated, the system can facilitate the transfer of funds to the digital identity owner through secure payment gateways or integrated financial systems.

The compensation process can be automated to ensure timely and accurate payments, with detailed transaction records maintained for auditing and reporting purposes. To ensure seamless adoption and compatibility, the tracking system should be designed to integrate with existing content distribution platforms, digital rights management systems, and payment infrastructures. APIs and standardized data formats can be used to enable smooth data exchange and interoperability between the tracking system and other relevant systems used by broadcasters, content providers, and end-user devices. The tracking system should also be flexible and adaptable to accommodate future technological advancements and changes in content consumption patterns, such as the emergence of new platforms, devices, and new and emerging technologies.

Given the sensitive nature of the data collected by the tracking system, robust data privacy and security measures must be implemented to protect the personal information of end users and the commercial interests of content owners and digital identity owners. The system should adhere to applicable data protection regulations, such as GDPR or CCPA, and employ industry-standard encryption, access controls, and data anonymization techniques to safeguard the collected data. Clear and transparent data privacy policies should be communicated to end users, outlining how their data is collected, used, and protected, and providing them with the necessary controls to manage their privacy preferences.

For the third step, for standard use cases covered by SAG-AFTRA scales, the system automatically applies the predefined rates based on the selected contract type and use case. The system may allow for the negotiation of compensation terms between the performer (or their representative) and the producer. These negotiated terms may include factors such as the performer's day rate, usage duration, residual rate, and/or revenue share percentages. The agreed-upon compensation terms are stored in the consent matrix and smart contracts to ensure accurate calculation and disbursement of payments.

For the fourth step, the producer attaches a script for the performer to approve.

Per SAG-AFTRA collective bargaining agreements and contracts, transparency and informed consent is required. Examples of such transparency and informed consent includes large language model (LLM) ingestion, training of artificial intelligence (AI), profanity, political content, sexual content, nudity and intimacy, sensitive subject matters, and more.

In a medical context, training AI systems may involve data protection and privacy, and consent for specific uses of health information. For example, data protection and privacy may include security measures to protect the digital identity, anonymization processes for research on AI training, and patient's rights regarding their digital identity such as including access, correction and deletion. Consent for specific uses may include separate consent options for different uses such as treatment, research, and AI training, as well as options for limiting certain uses of the digital identity and a process for updating consent preferences.

In a manufacturing setting, a consent matrix could be created to protect a worker and may be used to authorize the use of a digital replica of a machine operator for the purpose of optimizing a specific production process. The consent matrix may specify when capture of a worker's identity is authorized, the purpose and scope of digital replica use, measures for data protection and privacy, consent for specific applications, a potential impact on the worker, and authorizations and oversight, and time limitations and consent renewal.

In a worker protection setting, a consent matrix may be used to specify consent for capture and usage of a worker's digital identity: including types of biometric data being captured (e.g., motion data such as movement patterns, auditory data such as voice commands, visual data), specific work processes being recorded, duration and frequency of data capture. The consent matrix may also or alternatively specify the purpose and scope of digital replica use: including a detailed description of how the digital replica will be used (e.g., process optimization, training simulations, safety analysis), specific manufacturing processes or equipment involved, potential for the digital replica to be used in AI or machine learning systems. The consent matrix may also or alternatively specify data protection and privacy: including security measures to protect the worker's digital identity, anonymization processes for data used in broader analyses, and worker's rights regarding their digital replica (access, correction, deletion). The consent matrix may also specify consent for specific applications: including separate consent options for different uses (e.g., process optimization, training new workers, safety demonstrations), options for limiting certain uses of the digital replica, and a process for updating consent preferences, and a process for updating consent preferences. The consent matrix may also specify the potential impact on a worker: including how use of the digital replica might affect job evaluation or performance metrics, assurance that the digital replica will not be used for surveillance or punitive purposes, and any potential benefits to the worker (e.g., improved safety, reduced physical strain). The consent matrix may also specify authorization and oversight: including approval from relevant managers and union representatives (if applicable), a process for regular review of digital replica usage, and a mechanism for worker feedback on the use of their digital replica. Finally, a consent matrix may specify time limitations and consent renewal: including, duration of the consent, a process for renewing or withdrawing consent, and how changes in digital replica usage will be communicated to the worker.

In cases where consent is not granted, a feedback q, allowing performers or representatives to communicate their concerns or reasons for refusal. This feedback is integral to maintaining transparency and trust within the system.

Modification/addition/removal of specific compensation terms may be negotiated via notifications (email, platform-based, SMS, etc.) until both performer (or designated representative) and producer have signed the agreement in the system.

Consent, once given, is recorded in a Consent Matrix-a permissions data file that comprehensively documents the terms and conditions agreed upon. This matrix is then integrated into the central system, serving as a binding agreement that governs the use of the digital replica.

The central system, upon receiving the consent matrix, finalizes the hire request. It logs the transaction and updates the system's records to reflect the new usage agreement, thus concluding the hire request protocol. As set forth above, a secure, transparent, and efficient protocol for hiring digital replicas, with informed consent as its cornerstone. This process ensures that performers maintain control over their digital likenesses and that all usage is ethical and authorized, reflecting the principles of respect and integrity central to this patent.

A media creation call workflow is explained next. FIG. 3: Media Creation Call represents the production workflow critical to the utilization of digital replicas in post-production environments. The components and stages delineated in FIG. 3 illustrate a systematic approach to accessing and employing digital replicas in the creation of media content.

The workflow commences with a request within the central system, which serves as the command center for all operations. The central system fields the request for a digital replica, identifying the specific needs and parameters of the media project at hand .

The system then matches the request with the appropriate digital replica. This process ensures that the correct digital identity is used in alignment with the digital watermark, consent matrix and the predefined usage permissions.

Once the appropriate digital replica is identified, the media file, accompanied by a Universal Unique Identifier (UUID #), is retrieved from the media vault. This vault contains digitally watermarked content, ensuring the provenance and integrity of the media.

If the production requires the creation of an AI pattern replica, the system interfaces with the AI (Pattern) Replica Vault. This vault houses digitally watermarked algorithmic models that can be used to generate new media content based on the existing digital replicas. The proper AI (Pattern) Replica, accompanied by a Universal Unique Identifier (UUID #), is retrieved from its vault.

A generative model may be a trained artificial intelligence model that is trained based on biometric input from a person, and then capable of generating and outputting synthetic digital content based on the biometrie input from the person, such as text-to-speech or speech-to-text. Entities such as ElevenLabs are training such artificial intelligence models to replicate voices of people, though not yet with watermarking or using consent matrices in the manner taught herein. An artificial intelligence integration layer may be provided for securely communicating between the digital identity management system and external artificial intelligence systems such as the system(s) provided by entities such as ElevenLabs. A permission verification module may then be provided for ensuring that the use of watermarked artificial intelligence patterns and digital replicas in artificial intelligence systems adhere to the stored permission matrices. A monitoring and auditing module may be provided for tracking the use of watermarked artificial intelligence patterns and digital replicas in artificial intelligence systems and detecting potential misuse or unauthorized access.

As an example, a modelling system may be provided that inputs captured biometric data and outputs a derived generative model for biometric characteristics of a human. The derived generative model may be watermarked such that output from the derived generative model is watermarked. The underlying captured biometric data may include at least one of visual data, auditory data, and motion data.

As set forth herein, an intended use for artificial intelligence models may be to create a derivation of a person as a digital replica, and the digital replica may in turn be used by artificial intelligence models as an input to create new content as new digital content files. The digital replica and new digital content files may be monitored for compliance and may be logged for auditing. The use of the watermarked digital replica by an artificial intelligence system may be monitored to ensure compliance with the permissions specified in the associated consent matrix. Some or all access and usage of the watermarked digital replica by the artificial intelligence system may be logged on to the blockchain ledger for auditing and dispute resolution purposes.

In the case that ingestion into systems such as Generative Artificial Intelligence erases the watermarking data, an identical watermark may be added to the content at the end of the new creation process in order to continue the chain of protection/management/monetization of a performer's biometric data.

A generative model is a type of artificial intelligence (AI) model that is trained on biometric input data from a person, such as their voice, facial features, or other unique characteristics. Once trained, the generative model can generate synthetic digital content that mimics the biometric characteristics of the person, effectively creating a digital replica. Companies like ElevenLabs are developing AI models that can replicate people's voices, but they may not be implementing the same level of watermarking or consent management as outlined in the digital identity management system.

To ensure secure communication between the digital identity management system and external AI systems like those provided by ElevenLabs, an AI integration layer is necessary. This integration layer acts as a bridge, facilitating the exchange of data and ensuring that the watermarked AI patterns and digital replicas are properly handled and protected when used in external AI systems. The integration layer should implement robust security protocols, such as encryption and authentication, to prevent unauthorized access or misuse of the digital replicas.

A permission verification module is a critical component of the digital identity management system, responsible for ensuring that the use of watermarked AI patterns and digital replicas in external AI systems adheres to the permissions specified in the associated consent matrices. This module checks the consent matrices stored on the blockchain ledger to determine whether a particular use of a digital replica is authorized or not. If the requested use is permitted according to the consent matrix, the permission verification module allows the external AI system to proceed with generating new content using the digital replica. If the requested use is not authorized, the permission verification module blocks the access and prevents the generation of new content, protecting the rights and privacy of the individual represented by the digital replica.

To ensure ongoing compliance and detect potential misuse or unauthorized access, a monitoring and auditing module is essential. This module continuously tracks the use of watermarked AI patterns and digital replicas in external AI systems, logging some, most or all access and usage events on the blockchain ledger. By maintaining a comprehensive and immutable record of all interactions with the digital replicas, the monitoring and auditing module enables transparency and accountability. In case of any suspected misuse or unauthorized access, the module can trigger alerts and provide evidence for dispute resolution and legal proceedings.

An important use case for AI models is to create derivative works based on a person's digital replica. For example, an AI model trained on a person's voice (denoted as "AI (PATTERN) REPLICA" in FIG. 1A) can generate new speech content that sounds like the individual. When a digital replica is used as input to an AI model to create new digital content files, both the original digital replica and the resulting derivative content should be monitored for compliance with the associated consent matrix. The monitoring and auditing module should track the use of the watermarked digital replica throughout the content generation process, ensuring that its use remains within the bounds of the permissions granted by the individual. Any derivative content generated using the digital replica should also be watermarked and logged on the blockchain ledger, creating a traceable and auditable record of its origin and use.

To maintain a tamper-proof and transparent record of all access and usage of watermarked digital replicas by AI systems, it is crucial to log these events on a blockchain ledger. While the blockchain may not necessarily store a record of each use of digital content, the blockchain may be used to store records of disputes and changes such as additions to consent. An example of such a change may be when a producer wants to extent a commercial run for 6 more months. Each time creation/use of a digital replica is disputed, the details of the interaction, including the specific use case, the parties involved, and the timestamp, may be recorded on the blockchain. This immutable and distributed ledger serves as a reliable source of truth for auditing purposes, allowing for easy verification of compliance with the associated consent matrices. In case of disputes or legal challenges, the blockchain records can provide compelling evidence to support the rights and interests of the individuals represented by the digital replicas.

In some embodiments, only additional content is logged into a blockchain. In other embodiments, an entry in a blockchain for an item of digital content may be replaced when the item of digital content is updated, and a new consent matrix and watermark are generated. In other words, this and other types of efficiencies may be used to minimize entries to the blockchain and queries to the blockchain. Similarly, for enforcement, a paradigm such as the Nielsen system, crowdsourcing, and cooperative users may drive the system towards accurate representations of content usage.

The selected media and/or AI replica is/are then transferred to a virtual clean room. This secure digital environment facilitates the interaction between the production team and the digital replicas while maintaining the highest security standards.

Within the virtual clean room, the production API allows for seamless integration with various production tools and platforms. This integration enables the manipulation and use of the digital replicas (media and/or AI replica) in various stages of media production, from editing to animation. Examples of Production software that would plug into the API include protocols, logic pro, avid, DaVinci resolve, adobe premiere, blender, maya, 3DS max, unreal engine and more.

Post-production, the newly created content is stored in the streaming media vault. This vault retains the content for future use, ensuring that all media remains digitally watermarked and secure.

A digital DNA LLM vault may involve the inclusion of an AI Replica into an LLM that will be modularly used in larger LLMs (e.g., video games, virtual real-time media, virtual assistants, etc.). The resulting LLM is then to be in a separate vault for the Digital DNA LLM, also encode with the latest watermarking information, ready for future production calls/appearances in virtual interactive experiences.

As set forth above, the media creation call workflow provides a comprehensive blueprint for the secure and authorized use of digital replicas in media production. The workflow ensures that each step, from initial request to final storage, adheres to the stringent security protocols and consent guidelines established by the system.

Figure 4:
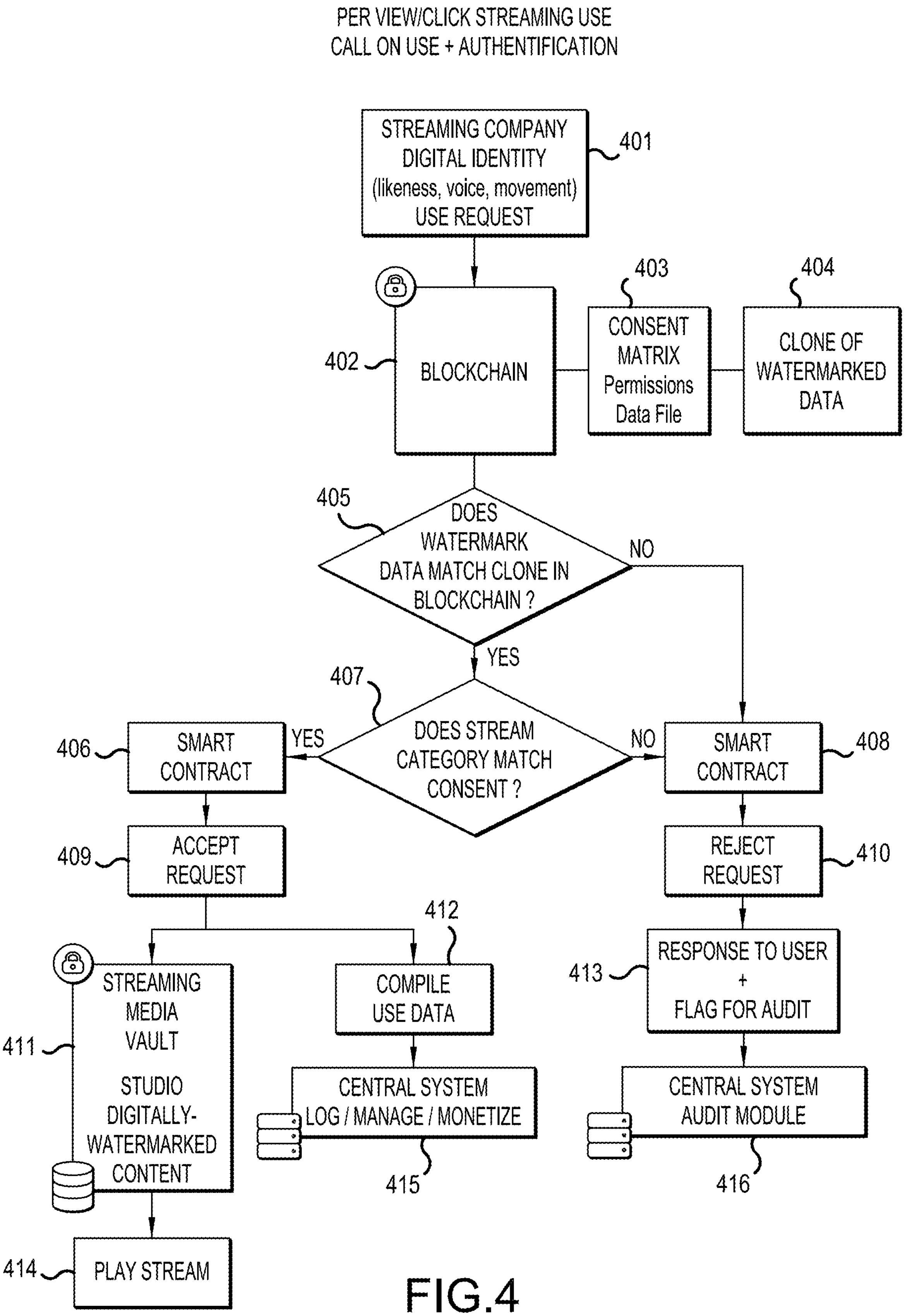
FIG. 4: illustrates a hybrid process and system for obtaining approval to use media content with a digital replica in a per view or streaming use, according to an aspect of the present disclosure.

FIG. 4: illustrates a hybrid process and system for obtaining approval to use media content with a digital replica in a per view or streaming use, according to an aspect of the present disclosure.

Next is an example specifically addressing SAG-AFTRA performers and the use of their digital identity through all streaming media. FIG. 4: Per View/Click Streaming Use depicts a critical process in the digital identity management system for streaming services. The mechanisms that authenticate the use of digital identities and manage permissions for every view or click in a streaming environment are detailed.

The process of FIG. 4 initiates at 401 when a streaming company submits a digital identity use request. This request typically includes the desired likeness, voice, or movement data necessary for a particular media stream. In the SAG-AFTRA example, the query may also contain and ICDR Job #, performer name, SAG-AFTRA ID #, company information, SAG-AFTRA contract, use cases, project information, duration, compensation, and media type, as well as other project specific information. This information must match the information on the digital watermark on the media and in the blockchain.

Upon receipt of a use request, the system conducts a query against the blockchain at 402. This step compares the digital watermarks in the context of the query, verifies authenticity, and checks the validity of the request against the blockchain's immutable ledger. The system consults the consent matrix at 403 to ensure that the use request aligns with the permissions set forth by the digital identity owner. This matrix houses the permissions data file, which dictates the allowable uses of the digital identity. The system also retrieves the clone of the watermarked data at 404.

At 405 a determination is made as to whether the watermark data matches the clone in the blockchain. If there is a match at 405 (405=Yes), at 407 another determination is made as to whether the stream category matches the consent matrix. If the watermark data matches the blockchain entry (405=Yes) and the stream category matches the performer's consent (407=Yes), a smart contract is executed at 406. This contract is the digital agreement that enforces the terms of use as per the consent matrix. If there is no match at 405 or 407, another smart contract is executed at 408 Based on the smart contract's outcome, the request is either accepted at 409 or rejected at 410. An accepted request proceeds to the streaming media vault at 411 for content delivery as a stream that is played at 414. A rejected request triggers a response to the user and a flag for an audit at 413, after which the rejected request is stored in an audit module of a central system at 416. Accepted requests allow the streaming company to stream the agreed-upon content.

The central system compiles use data at 412 and logs, manages and monetizes usage at 415. Usage logging: Each instance of a user watching content featuring a digital persona is logged by the central system. This includes details such as the specific episode, commercial, or movie watched, the user's information, the platform, the duration of the view, the date, and the time. Additionally, the system captures granular data about the performer's appearance in the content, such as the scenes they appear in and the duration of their appearance. These usage logs form the basis for calculating compensation. Compensation Management: The system retrieves the compensation terms agreed upon during the Informed Consent Protocol from the consent matrix and smart contracts. These terms may include standard SAG-AFTRA rates, negotiated terms for non-standard use cases, or pro-rata calculations based on the percentage of content viewed by the user. Transaction Recording: Based on the aggregated usage data and the retrieved compensation terms, the system initiates a transaction on the blockchain to record the compensation details. This transaction includes the total amount to be paid, the recipients (the performers), and references to the associated usage logs. Compensation Monetization: The system aggregates the usage data over a specified period (e.g., daily, weekly, or monthly) and calculates the total compensation owed to each digital identity owner based on the agreed-upon terms. The system then initiates the transfer of funds from the content provider's designated account or wallet to the performer's account or wallet. This ensures that performers are accurately compensated for the use of their digital personas in accordance with the terms established during the informed consent process. The specific frequency and method of transactions may vary depending on the industry standards and the agreements between the parties involved.

In the event of a rejected request, the central system's audit module is engaged. This module reviews the request against the consent matrix and blockchain ledger to determine the reason for rejection and to maintain system integrity.

The authentication process for per view/click streaming use, highlighting the system's capability to manage and protect digital identities is set forth above. By outlining each step of the process, the process underscores the reliability and security of the system in handling streaming requests.

Figure 5:
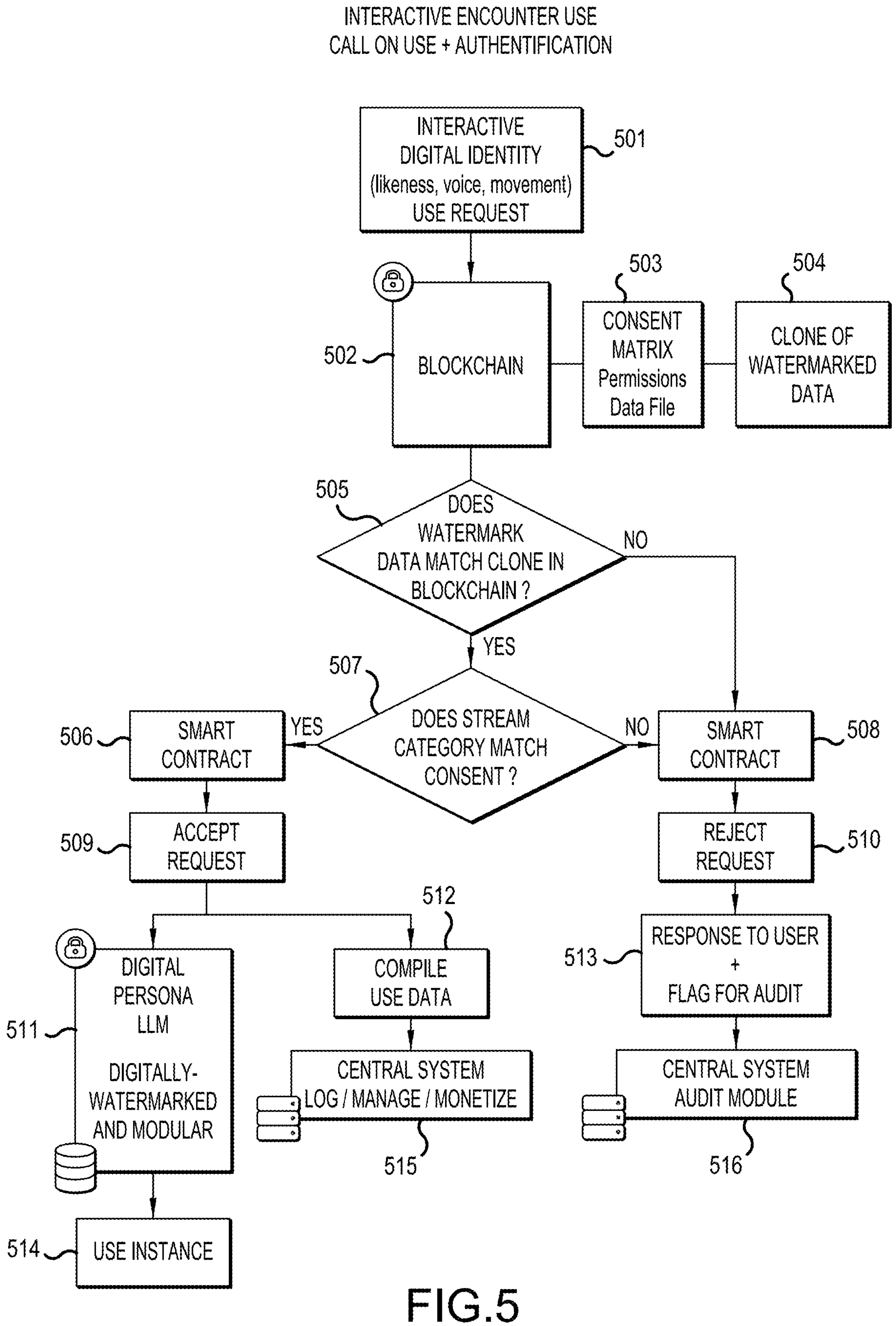
FIG. 5: illustrates a hybrid process and system for obtaining approval to use a digital replica in an interactive environment, such as video games, tour guides, VR, AR, virtual assistants, chatbots, interactive media and entertainment, personalized entertainment (interactive movies, virtual influencers and celebrities, etc.), according to an aspect of the present disclosure.

FIG. 5: illustrates a hybrid process and system for obtaining approval to use a digital replica in an interactive environment, such as video games, tour guides, VR, AR, virtual assistants, chatbots, interactive media and entertainment, personalized entertainment (interactive movies, virtual influencers and celebrities, etc.), according to an aspect of the present disclosure.

As we stand on the brink of a new era in digital interaction, FIG. 5: Interactive (Game) Encounter Use illustrates a process for the use of digital identities in interactive environments, such as video games and augmented reality experiences. The description of FIG. 5 explores the system's capabilities to authenticate use requests for interactive digital identities and outlines a monetization model that compensates the digital persona's originator each time an encounter occurs.

At 501, an interactive digital identity use is requested. At 502, a request is sent to a blockchain to retrieve a consent matrix at 503 and a clone of watermarked data at 504. At 505, a determination is made as to whether the watermark data matches the clone in the blockchain. If there is no match (505=No), a smart contract is generated at 508 to reject the request at 510 and to respond to the user and flag the request for audit at 513 and store the smart contract in an audit module of a central system at 516.

If there is a match at 505 (505=Yes), another determination is made at 507 as to whether a stream category matches consent in the consent matrix. If not, (507=No), a smart contract is generated at 508 and the process from 508 repeats. If there is a match at 507 (507=Yes), at 506 a smart contract is generated, and the request is accepted at 509. At 511 a digital personal large language model (LLM) is applied to generate the use of the interactive digital identity as a use instance at 514. Use data for the accepted request is compiled at 512 and stored in the central system at 515.

The emergence of interactive digital identities reflects the increasing fusion of digital personas with interactive media platforms marks a significant evolution in content consumption. In video games, players can encounter characters like a wizard, whose likeness and voice are based on a real performer's digital identity. Similarly, AR (augmented reality) guides in museums or virtual assistants represent another powerful application of this technology.

In terms of requesting and authentication digital identities, the utilization process begins when an interactive platform submits a request to call upon a specific digital identity for use within its environment. The system then queries the blockchain to validate the digital watermark associated with the requested identity, ensuring it matches the one recorded on the ledger.

Similar to streaming described above, in the SAG-AFTRA example, the query may contain ICDR Job #, performer name, SAG-AFTRA ID #, company information, SAG-AFTRA contract, use cases, project information, duration, compensation, and media type, as well as other project specific information. This information must match the information on the digital watermark on the media and in the blockchain.

In terms of consent matrix verification, a consent matrix is consulted to confirm the digital persona's availability for the specific interactive use case. This verification step is crucial to ensure the performer's consent for the particular encounter type and setting, be it a wizard's castle in a game, a historical tour in a museum, or a virtual assistant in a car.

A verification system may be used to check whether digital content files are authorized for proposed uses according to a consent matrix. A consensus mechanism may be used to ensure consistency and immutability of a distributed ledger across all nodes. A smart contract layer may be used to execute automated permission verification and access control based on the stored consent matrices. The smart contract layer may be implemented at distributed servers, in one or more data centers, at broadcasters, and/or at end user systems, as well as the verification system. The smart contract layer may log usage. An API layer may enable secure communication between the blockchain nodes and external systems, such as digital content creation tools and distribution platforms. A monitoring and alerting module may detect and report unauthorized access attempts or potential fraud activities at the verification system.

A verification system may store clones of watermarks so that embedded watermarks retrieved from digital content files may be sent to the verification system so that the verification system compares thee embedded watermarks with the clones. The verification system may then send confirmation to a player system when the embedded watermark matches the clone of the embedded watermark.

A method for detecting fraud and resolving disputes in a digital identity management system may include continuously monitoring the use of watermarked digital content and artificial intelligence patterns across various platforms and systems. The detected use may be compared with the permissions stored in the associated permission matrices on the blockchain ledger. Any detected use that deviates from the stored permissions may be flagged as potential fraud or unauthorized use. The relevant parties, such as the digital content owners and authorized users, may be notified of the potential fraud or unauthorized use. Relevant parties who may be notified may include owners of intellectual property or their proxies, performers, representatives, a union, auditors, government authorities, and more, varying based on the type of notification. A dispute resolution process, which may involve manual review, arbitration, or automated resolution based on predefined rules and conditions, may then be initiated. The outcome of the dispute resolution process may be stored on the blockchain ledger as an immutable record. The permission matrices and access control policies may be updated based on the outcome of the dispute resolution process.

Continuous monitoring may be enabled for the digital identity management system by employing a comprehensive monitoring mechanism that continuously tracks the use of watermarked digital content and AI patterns across various platforms and systems. This monitoring process covers a wide range of digital assets, including audio, video, images, and AI-generated content, ensuring that all instances of use are captured and analyzed.

The monitoring system is designed to be scalable and adaptable, capable of integrating with new platforms and technologies as they emerge.

Permissions may be determined when each detected use of watermarked digital content or AI patterns is compared against the permissions stored in the associated permission matrices on the blockchain ledger. The permission matrices define the authorized uses, limitations, and conditions for each digital asset, as determined by the content owners or rights holders. By cross-referencing the detected use with the stored permissions, the system can automatically identify any discrepancies or potential violations.

When a detected use deviates from the permissions outlined in the associated consent matrix, it is flagged as potential fraud or unauthorized use. A system may be provided to log all unauthorized use detected, including potential fraud or unauthorized use that cannot be confirmed to a required degree. The system employs sophisticated algorithms and heuristics to determine the severity and likelihood of the violation, considering factors such as the nature of the use, the extent of the deviation, and any historical patterns of misuse. Flagged incidents are prioritized based on their potential impact and urgency, allowing for efficient allocation of resources in the dispute resolution process.

Once potential fraud or unauthorized use is flagged, the system may automatically notify the relevant parties, including the digital content owners, authorized users, unauthorized users, and any designated representatives or administrators. Notifications are sent through secure communication channels, such as encrypted email or messaging platforms, to ensure confidentiality and prevent unauthorized interception. The notifications provides details about the specific incident, including the digital asset involved, the nature of the violation, and any available evidence or documentation.

The digital identity management system may include a comprehensive dispute resolution process to address flagged incidents of potential fraud or unauthorized use. The dispute resolution process may involve multiple stages and approaches, depending on the complexity and severity of the incident: Human experts, such as legal professionals or content specialists, may manually review the flagged incident, examining the evidence and assessing the validity of the claim. They may engage with the relevant parties to gather additional information and facilitate communication. In cases where manual review is insufficient or the parties cannot reach a resolution, the dispute may be escalated to an arbitration process. Independent arbitrators, who are experts in digital rights management and intellectual property law, review the case and make a binding decision based on the evidence and applicable legal frameworks.

For certain types of disputes or low-complexity incidents, the system may employ automated resolution mechanisms based on predefined rules and conditions. These automated processes can quickly resolve straightforward cases, such as clear-cut violations of usage terms or minor discrepancies in permissions. The outcome of each dispute resolution process, whether through manual review, arbitration, or automated resolution, is recorded on the blockchain ledger as an immutable record. This ensures transparency and accountability in the dispute resolution process, providing a tamper-proof and auditable trail of decisions and actions taken. The blockchain record includes relevant details such as the parties involved, the specific digital asset, the nature of the violation, the evidence considered, and the final resolution or decision reached.

Based on the outcomes of the dispute resolution processes, the permission matrices and access control policies associated with the affected digital assets are updated accordingly. If a violation is confirmed, the permissions may be revised to prevent similar incidents in the future, such as revoking access for the offending party or tightening usage restrictions. If a dispute is resolved in favor of the accused party, the permissions may be clarified or expanded to reflect the legitimate use case and prevent false positives in future monitoring.

Upon successful verification, a smart contract automates the approval process. If the request matches the consent criteria, it is accepted, triggering the interactive digital persona's instantiation in the game or augmented reality environment.

A monetization mechanism activates with each player's encounter with the digital persona. This system calculates the compensation due to the performer's digital identity for the interaction, similar to a pay-per-view model but tailored for immersive environments.

In the context of interactive digital identity utilization, such as in video games or augmented reality experiences, the central system log and compensation management component play a crucial role in tracking usage and ensuring proper compensation.

Each interaction or encounter with a digital persona in an interactive experience is meticulously logged by the central system. This includes details such as the specific digital identity used, the nature of the interaction, the duration of the encounter, and any other relevant metadata. Comprehensive metadata may be used to encode captured biometric data through a digital watermarking process, and used to mark digital content files containing the captured biometric data. These usage logs form the basis for calculating compensation.

The central system retrieves the compensation terms associated with each digital identity from the consent matrix and smart contracts. These terms, which were agreed upon during the Informed Consent Protocol, may include negotiated rates, revenue share percentages, or other non-standard arrangements specific to interactive experiences.

Based on the aggregated usage data and the retrieved compensation terms, the central system initiates a transaction on the blockchain to record the compensation details. This transaction includes the total amount to be paid, the recipients (the digital identity owners), and references to the associated usage logs.

The system aggregates the usage data over a specified period (e.g., daily, weekly, or monthly) and calculates the total compensation owed to each digital identity owner based on the agreed-upon terms. The system then initiates the transfer of funds from the interactive experience provider's designated account or wallet to the performer's account or wallet. This ensures that performers are accurately compensated for the use of their digital personas in interactive experiences in accordance with the terms established during the informed consent process. The specific frequency and method of transactions may vary depending on the industry standards and the agreements between the parties involved.

Should a request be rejected, or if discrepancies arise, the central system's audit module is flagged. This facilitates immediate review and maintains the integrity of the consent and monetization process.

The process of employing interactive digital identities within game encounters and other interactive platforms is encapsulated. It emphasizes the system's adaptability to new media frontiers and the importance of equitable compensation models for performers in the digital age.

The utilization and monetization of interactive digital identities as detailed above are poised to transform the landscape of digital media. By ensuring the performers are compensated for every encounter, the system not only protects but also values the contribution of each individual's digital persona, setting the stage for a fair and sustainable interactive media ecosystem.

The systems described herein are not limited to performers. Rather, sensitive data relating to the biometric characteristics of persons may be protected using the teachings herein, and this may include health data and other forms of sensitive data. A system for enabling cross-industry compatibility and scalability of a digital identity management system may include a modular architecture that allows for the integration of industry-specific components, such as watermarking algorithms, metadata schemas, and permission matrices. The system may include a configurable workflow engine that enables the customization of digital identity management processes based on industry-specific requirements. An extensible API layer may facilitate seamless integration with various industry-specific systems and platforms. An API may also be defined for specific limited access to a clean room environment, where the API is installed in the clean room and an extremely limited set of access points/system. A scalable infrastructure may be provided to handle the storage and processing of large volumes of digital content and associated metadata across different industries. A governance framework may ensure compliance with industry-specific regulations and standards, such as data privacy laws and security guidelines. A continuous monitoring and improvement process may incorporate feedback from different industries to enhance the system's effectiveness and adaptability.

As one example for the healthcare industry, a digital identity management system may secure and manage access to electronic health records (EHRs) and other sensitive patient data. The modular architecture integrates healthcare-specific components, such as HIPAA-compliant watermarking and metadata schemas. The configurable workflow engine may align with hospital protocols, while the extensible API layer enables integration with existing healthcare systems. The clean room environment allows for secure data analysis and research, with controlled access via the API. The scalable infrastructure handles large volumes of patient data, and the governance framework ensures compliance with HIPAA regulations.

As another example for the government and public sector, the digital identity management system may secure and manage access to classified documents, government record systems, and official correspondence, such as based on security clearance levels. The modular architecture integrates government-specific components, such as classified watermarking and metadata schemas. The configurable workflow engine may align with government protocols and approval processes, while the extensible API layer enables integration with existing government systems. The clean room environment allows for secure briefings and classified meetings, with controlled access via the API. The scalable infrastructure handles large volumes of government data, and the governance framework ensures compliance with classified information handling regulations and data privacy laws, such as the Privacy Act of 1974.

In terms of protection of sensitive biometric data, the digital identity management system described herein is not limited to protecting the biometric data of performers in the entertainment industry. The same principles and techniques can be applied to safeguard sensitive data relating to the biometric characteristics of individuals across various domains, including healthcare, finance, education, and more. By extending the protection to health data and other forms of sensitive information, the system demonstrates its versatility and broad applicability in ensuring the privacy and security of individuals' biometric data.

In terms of a modular architecture for cross-industry compatibility, to enable cross-industry compatibility and scalability, the digital identity management system incorporates a modular architecture. This modular design allows for the seamless integration of industry-specific components, such as watermarking algorithms, metadata schemas, and permission matrices. By providing a flexible and adaptable framework, the system can accommodate the unique requirements and standards of different industries without compromising its core functionality or security.

In terms of a configurable workflow engine, the system includes a configurable workflow engine that enables the customization of digital identity management processes based on industry-specific needs. This workflow engine allows organizations to define and implement their own business rules, approval processes, and data handling procedures, tailored to the specific requirements of their industry. By offering a high degree of configurability, the system ensures that it can be easily adapted to fit the diverse operational contexts and regulatory landscapes of different sectors.

In terms of an extensible API layer (Application Programming Interface layer), the API layer may be an important component of the digital identity management system, facilitating seamless integration with various industry-specific systems and platforms. The API layer provides a set of well-defined interfaces and protocols that allow external systems to interact with the digital identity management system, exchanging data and triggering specific actions or processes. By designing the API layer to be extensible and flexible, the system can accommodate the integration requirements of a wide range of industry-specific technologies, such as electronic health record systems, financial transaction platforms, or educational software suites.

In terms of scalable infrastructure, to support the storage and processing of large volumes of digital content and associated metadata across different industries, the digital identity management system incorporates a scalable infrastructure. This infrastructure is designed to handle the massive amounts of data generated by the increasing adoption of biometric technologies and the proliferation of digital content across various sectors. By leveraging cloud computing, distributed storage, and parallel processing capabilities, the system can efficiently manage and analyze vast quantities of data, ensuring optimal performance and responsiveness regardless of the industry or scale of deployment.

In terms of a governance framework for compliance, the digital identity management system includes a comprehensive governance framework to ensure compliance with industry-specific regulations and standards. This framework encompasses a set of policies, procedures, and controls that are designed to meet the specific legal and ethical requirements of each industry, such as data privacy laws (e.g., GDPR, HIPAA, US Privacy Act of 1974), security guidelines (e.g., ISO 27001, NIST), and sector-specific regulations. By embedding compliance mechanisms into the core architecture of the system, organizations can ensure that their use of biometric data and digital identities aligns with the relevant regulatory mandates and best practices, mitigating legal and reputational risks. Many items of legislation have been passed or proposed at the state level in the United States, including California legislation protecting digital replicas of deceases persons (AB 1836), legislation for contracts involving digital replicas (AB 2602), legislation establishing content provenance (SB 942), the United States NO FAKES ACT and the UNITED STATES COPIED ACT.

In terms of continuous monitoring and improvement, to enhance the system's effectiveness and adaptability across different industries, a continuous monitoring and improvement process is implemented. This process involves actively seeking and incorporating feedback from stakeholders in various sectors, including end-users, industry experts, and regulatory bodies. By continuously monitoring the performance and usage patterns of the digital identity management system in different industry contexts, developers can identify areas for optimization, address emerging challenges, and introduce new features or enhancements that cater to the evolving needs of each sector.

Regular system updates, security patches, and functionality expansions based on industry feedback ensure that the digital identity management system remains relevant, effective, and aligned with the latest industry standards and best practices.

FIG. 6 illustrates a computer system representative of electronic devices by which systems described herein may be implemented, in accordance with another representative embodiment.

Referring to FIG. 6, the computer system 600 includes a set of software instructions that can be executed to cause the computer system 600 to perform any of the methods or computer-based functions disclosed herein. The computer system 600 may operate as a standalone device. Alternatively, the computer system 600 may operate as a client user computer in a server-client user network environment, or as a peer-to-peer computer system in a peer-to-peer (or distributed) network environment. The computer system 600 can also be implemented as or incorporated into various devices, such as a tablet computer or any other camera-equipped machine capable of executing a set of software instructions (sequential or otherwise) that specify actions to be taken by that machine. In an embodiment, the computer system 600 can be implemented using electronic devices that provide voice, video or data communication.

As illustrated in FIG. 6, the computer system 600 includes a processor 610. The processor 610 may be considered a representative example of a processor of a controller and executes instructions to implement some or all aspects of methods and processes described herein. The processor 610 is tangible and non-transitory. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The processor 610 is an article of manufacture and/or a machine component. The processor 610 is configured to execute software instructions to perform functions as described in the various embodiments herein. The processor 610 may be a general-purpose processor or may be part of an application specific integrated circuit (ASIC). The processor 610 may also be a microprocessor, a microcomputer, a processor chip, a controller, a microcontroller, a digital signal processor (DSP), a state machine, or a programmable logic device. The processor 610 may also be a logical circuit, including a programmable gate array (PGA), such as a field programmable gate array (FPGA), or another type of circuit that includes discrete gate and/or transistor logic. The processor 610 may be a central processing unit (CPU), a graphics processing unit (GPU), or both. Additionally, any processor described herein may include multiple processors, parallel processors, or both. Multiple processors may be included in, or coupled to, a single device or multiple devices.

The term "processor" as used herein encompasses an electronic component able to execute a program or machine executable instruction. References to a computing device comprising "a processor" should be interpreted to include more than one processor or processing core, as in a multi-core processor. A processor may also refer to a collection of processors within a single computer system or distributed among multiple computer systems. The term computing device should also be interpreted to include a collection or network of computing devices each including a processor or processors. Programs have software instructions performed by one or multiple processors that may be within the same computing device or which may be distributed across multiple computing devices.

The computer system 600 further includes a main memory 620 and a static memory 630, where memories in the computer system 600 communicate with each other and the processor 610 via a bus 608. Either or both of the main memory 620 and the static memory 630 may be considered representative examples of a memory of a controller, and store instructions used to implement some, or all aspects of methods and processes described herein. Memories described herein are tangible storage mediums for storing data and executable software instructions and are non-transitory during the time software instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The main memory 620 and the static memory 630 are articles of manufacture and/or machine components. The main memory 620 and the static memory 630 are computer-readable mediums from which data and executable software instructions can be read by a computer (e.g., the processor 610). Each of the main memory 620 and the static memory 630 may be implemented as one or more of random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. The memories may be volatile or non-volatile, secure and/or encrypted, unsecure and/or unencrypted.

"Memory" is an example of a computer-readable storage medium. Computer memory is any memory which is directly accessible to a processor. Examples of computer memory include, but are not limited to RAM memory, registers, and register files. References to "computer memory" or "memory" should be interpreted as possibly being multiple memories. The memory may for instance be multiple memories within the same computer system. The memory may also be multiple memories distributed amongst multiple computer systems or computing devices.

As shown, the computer system 600 further includes a video display unit 650, such as a liquid crystal display (LCD), an organic light emitting diode (OLED), a flat panel display, a solid-state display, or a cathode ray tube (CRT), for example. Additionally, the computer system 600 includes an input device 660, such as a keyboard/virtual keyboard or touch-sensitive input screen or speech input with speech recognition, and a cursor control device 670, such as a mouse or touch-sensitive input screen or pad. The computer system 600 also optionally includes a disk drive unit 680, a signal generation device 690, such as a speaker or remote control, and/or a network interface device 640.

In an embodiment, as depicted in FIG. 6, the disk drive unit 680 includes a computer-readable medium 682 in which one or more sets of software instructions 684 (software) are embedded. The sets of software instructions 684 are read from the computer-readable medium 682 to be executed by the processor 610. Further, the software instructions 684, when executed by the processor 610, perform one or more steps of the methods and processes as described herein. In an embodiment, the software instructions 684 reside all or in part within the main memory 620, the static memory 630 and/or the processor 610 during execution by the computer system 600. Further, the computer-readable medium 682 may include software instructions 684 or receive and execute software instructions 684 responsive to a propagated signal, so that a device connected to a network 601 communicates voice, video or data over the network 601. The software instructions 684 may be transmitted or received over the network 601 via the network interface device 640.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72 (b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

I claim:

1. A system for securing digital content representing identity of a human, comprising:

a memory that stores instructions;

a processor that executes the instructions, the instructions comprising a watermarking program that, when executed by the processor, cause the system to:

create a first digital watermarking schema comprising a unique identifier that uniquely identifies the first digital watermarking schema and a plurality of digital watermarking elements characterizing provenance of a digital content file; and embed the first digital watermarking schema into the digital content file with biometric characteristics of a human present in the digital content file, thereby creating a first watermarked digital content file;

store in a ledger a clone of the first digital watermarking schema and a first consent matrix specifying authorized uses of the digital content file; and a verification system that, upon receiving a request to use the digital content file:

extracts the first digital watermarking schema embedded in the first watermarked digital content file, and compares the extracted first digital watermarking schema with the clone of the first digital watermarking schema stored on the ledger:

verifies that requested use is authorized by the first consent matrix stored on the ledger;

grants access for use of the digital content file if the requested use is authorized by the first consent matrix; and denies access for use of the digital content file if the requested use is not authorized by the first consent matrix, wherein verification that the requested use is authorized by the first consent matrix is performed by identifying a use type and comparing the use type with authorized uses specified in the first consent matrix, and wherein a notification of a result of the verification is generated and sent based on the verification.

2. The system of claim 1, wherein the plurality of digital watermarking elements comprise:

a timestamp of creation of the first digital watermarking schema, and metadata for the first watermarked digital content file.

3. The system of claim 1, wherein the first watermarked digital content file comprises health information for the human.

4. The system of claim 1, wherein the ledger comprises a distributed blockchain architecture of a plurality of blockchain nodes, each blockchain node storing a copy of a ledger containing watermarked identity datasets and permission matrices.

5. The system of claim 1, wherein the first watermarked digital content file includes captured biometric data comprising at least one of visual data, auditory data, and motion data.

6. The system of claim 5, further comprising:

a modelling system that inputs the captured biometric data and outputs a derived generative model for biometric characteristics of the human, wherein the derived generative model is watermarked such that output from the derived generative model is watermarked.

7. The system of claim 6, wherein the derived generative model creates a digital replica of the human by capturing and synthesizing biometric data comprising at least one of visual data, auditory data, or motion data, generates a unique identifier for the digital replica based on the biometric data, and embeds the unique identifier into the digital replica using a watermarking algorithm to create a watermarked digital replica such that the watermarked digital replica comprises the first watermarked digital content file.

8. The system of claim 7, wherein the system receiving a request to access the first watermarked digital content file, verifies permission based on the first consent matrix and, if the permission is verified, grants access to the watermarked first digital content file.

9. The system of claim 1, wherein the verification system authorizes use based on a deterministic match between a requested use type and authorized uses enumerated in the first consent matrix, wherein the first consent matrix comprises at least one of:

a declaration made in advance by a human creator, a declaration made in advance by a human subject whose biometric characteristics are present in the digital content file, a declaration made in advance by an entity holding copyright in the digital content file, or a declaration made by a designated representative authorized to act on behalf of the human creator, the human subject, or the entity; and wherein the designated representative comprises at least one of a human or a computational agent operating within delegated scope.

10. The system of claim 4, wherein the plurality of blockchain nodes comprises at least one node maintained by or on behalf of a human whose biometric characteristics are present in the digital content file, at least one node maintained by or on behalf of an organization that creates or distributes the digital content file, and at least one node maintained by an independent party.

11. The system of claim 1, wherein the first consent matrix comprises at least one of authorized uses declared by a human creator of the digital content file, authorized uses declared by a human subject whose biometric characteristics are present in the digital content file, or authorized uses declared by an entity holding copyright in the digital content file, and wherein when more than one of the authorized uses are present, the verification system authorizes use of the digital content file only when the requested use is permitted by all of the authorized uses which are present.

12. The system of claim 1, wherein:

the storing of the first consent matrix in the ledger is performed responsive to obtaining consent from a human whose biometric characteristics are present in the digital content file for use of an identity of the human in the digital content file; and the system further comprises an enforcement mechanism for enforcing rights of the human against unauthorized use of the identity of the human in the digital content file.

13. The system of claim 1, wherein, upon granting access, the verification system:

retrieves compensation terms from the first consent matrix;

records a transaction on the ledger; and initiates a transfer of compensation to the human whose biometric characteristics are present in the digital content file.

14. A system for securing digital content representing identity of a human, comprising:

a memory that stores instructions;

a processor that executes the instructions, the instructions comprising a watermarking program that, when executed by the processor, cause the system to:

create a first digital watermarking schema comprising a unique identifier that uniquely identifies the first digital watermarking schema and a plurality of digital watermarking elements characterizing provenance of a digital content file;

embed the first digital watermarking schema into the digital content file with biometric characteristics of a human present in the digital content file, thereby creating a first watermarked digital content file; and store in a ledger a clone of the first digital watermarking schema and a first consent matrix specifying authorized uses of the digital content file; and a derivation system for creating authorized derivations of the digital content file, comprising:

a memory that stores instructions, and a processor that executes the instructions, wherein, when executed by the processor, the instructions cause the derivation system to:

receive a request to create a derivation of the first watermarked digital content file;

verify the request against the first consent matrix stored on the ledger;

if the request is authorized, grant access to the first watermarked digital content file in a clean room environment, create a second digital watermarking schema comprising a unique identifier (UID/UUID) that uniquely identifies the second digital watermarking schema and a plurality of digital watermarking elements characterizing provenance of a derivation of the first watermarked digital content file, create the derivation of the first watermarked digital content file in the clean room environment, and embed the second digital watermarking schema into the derivation of the first watermarked digital content file, thereby creating a second watermarked digital content file;

store a record of creation of the second watermarked digital content file, including a second consent matrix, on the ledger;

release the second watermarked digital content file from the clean room environment.

15. A method for securing digital content representing identity of a human, comprising:

creating, by one or more processors, a first digital watermarking schema comprising a unique identifier that uniquely identifies the first digital watermarking schema and a plurality of digital watermarking elements characterizing provenance of a digital content file;

embedding the first digital watermarking schema into the digital content file with biometric characteristics of a human present in the digital content file, thereby creating a first watermarked digital content file; and storing in a ledger a clone of the first digital watermarking schema and a first consent matrix specifying authorized uses of the digital content file;

upon receiving a request to use the digital content file at a verification system:

extracting the first digital watermarking schema embedded in the first watermarked digital content file, and comparing the extracted first digital watermarking schema with the clone of the first digital watermarking schema stored on the ledger;

verifying that requested use is authorized by the first consent matrix stored on the ledger;

granting access for use of the digital content file if the requested use is authorized by the first consent matrix; and denying access for use of the digital content file if the requested use is not authorized by the first consent matrix, wherein verification that the requested use is authorized by the first consent matrix is performed by identifying a use type and comparing the use type with authorized uses specified in the first consent matrix, and wherein a notification of a result of the verification is generated and sent based on the verification.

16. A method for protecting an identity in a digital content file, the method comprising:

creating, by one or more processors, a first digital watermarking schema comprising a unique identifier that uniquely identifies the first digital watermarking schema and a plurality of digital watermarking elements characterizing provenance of the digital content file;

embedding the first digital watermarking schema into the digital content file with biometric characteristics of a human present in the digital content file, thereby creating a first watermarked digital content file;

storing on a ledger a clone of the first digital watermarking schema and a first consent matrix specifying authorized uses of the digital content file;

upon receiving a request to use the first watermarked digital content file, extracting the first digital watermarking schema embedded in the first watermarked digital content file, comparing the extracted first digital watermarking schema with the clone stored on the ledger, and verifying that the requested use is authorized by the first consent matrix;

responsive to the requested use being authorized by the first consent matrix, granting access for use of the digital content file, retrieving compensation terms from the first consent matrix, and generating a credit to the human for the authorized use based on the compensation terms; and responsive to detecting the first digital watermarking schema in a derivation of the first watermarked digital content file, and determining that the derivation is not authorized by the first consent matrix, initiating a notification of misuse of the identity of the human.

17. The method of claim 16, wherein the distributed ledger comprises a plurality of nodes including at least one node maintained by or on behalf of the human and at least one node maintained by or on behalf of an organization that creates or distributes the first item of digital media.

18. The method of claim 16, further comprising:

storing in the distributed ledger a record specifying authorized uses of the first item of digital media, wherein the record comprises at least one of authorized uses declared by the human, authorized uses declared by a creator of the first item of digital media, or authorized uses declared by an entity holding copyright in the first item of digital media, wherein when more than one of the declared authorized uses are present, use of the first item of digital media is permitted only when a requested use is permitted by all of the declared authorized uses which are present.

19. The method of claim 15, further comprising:

upon granting access for use of the digital content file, retrieving compensation terms from the first consent matrix;

recording a transaction on the ledger; and initiating a transfer of compensation to the human whose biometric characteristics are present in the digital content file.

* * * * *